US011696156B2

(12) United States Patent
Cooper et al.

(10) Patent No.: US 11,696,156 B2
(45) Date of Patent: Jul. 4, 2023

(54) METHODS AND APPARATUS FOR FLEXIBLE CONFIGURATION OF FRONTHAUL SPLIT RADIO UNITS

(71) Applicant: QUALCOMM Incorporated, San Diego, CA (US)

(72) Inventors: Rotem Cooper, San Diego, CA (US); Charles Alfred Bergan, Cardiff, CA (US); Victor Abramsky, Edison, NJ (US); Puneet Sethi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/163,064

(22) Filed: Jan. 29, 2021

(65) Prior Publication Data

US 2021/0243617 A1    Aug. 5, 2021

Related U.S. Application Data

(60) Provisional application No. 62/968,830, filed on Jan. 31, 2020.

(51) Int. Cl.
*H04W 24/02* (2009.01)
*H04B 7/06* (2006.01)
(Continued)

(52) U.S. Cl.
CPC .......... *H04W 24/02* (2013.01); *H04B 7/0617* (2013.01); *H04L 27/2607* (2013.01); *H04W 72/0453* (2013.01)

(58) Field of Classification Search
CPC .............. H04W 24/02; H04W 72/0453; H04B 7/0617; H04L 27/2607
See application file for complete search history.

(56) References Cited

U.S. PATENT DOCUMENTS

2018/0367358 A1* 12/2018 Baligh ................. H04L 5/0057
2020/0280966 A1*  9/2020 Baldemair ........... H04L 1/0009

FOREIGN PATENT DOCUMENTS

| EP | 3269118 A2 | 1/2018 |
| EP | 3474519 A1 | 4/2019 |
| WO | WO-2019027711 A | 2/2019 |

OTHER PUBLICATIONS

International Search Report and Written Opinion—PCT/US2021/016042—ISA/EPOdated May 3, 2021.
(Continued)

*Primary Examiner* — Joshua L Schwartz
(74) *Attorney, Agent, or Firm* — Holland & Hart LLP

(57) ABSTRACT

Methods, systems, and devices for wireless communications are described in which radio units (RUs), distributed units (DUs), or combinations thereof, may have a single hardware configuration that may be configured to implement different functions for radio frequency (RF) and baseband processing at a base station. A desired functionality for a RU or DU may be identified, and the RU or DU may be configured to implement the functionality through run-time configuration or boot images to implement a particular set of functions that may be needed for a particular cell or deployment. A RU or DU may be reconfigured following an initial configuration to perform different functions following the reconfiguration.

27 Claims, 23 Drawing Sheets

(51) Int. Cl.
*H04L 27/26* (2006.01)
*H04W 72/0453* (2023.01)

(56) References Cited

OTHER PUBLICATIONS

NGMN Alliance: "NGMN Overview on 5G RAN Functional Decomposition", 3GPP Draft, 180226 NGMN_RANFSX_D1_V20_FINAL, 3rd Generation Partnership Project (3GPP), Mobile Competence Centre, 650, Route Des Lucioles, F-06921, Sophia-Antipolis Cedex, France, Apr. 8, 2018 (Apr. 8, 2018), XP051433613, V1.0 ,Feb. 24, 2018, 47 pages, Retrieved from the Internet: URL: http://www.3gpp.org/ftp/Meetings%5F3GPP%5FSYNC/SA5/Docs/ [retrieved on Apr. 8, 2018] p. 18 p. 45; figure 19.

* cited by examiner

METHODS AND APPARATUS FOR FLEXIBLE CONFIGURATION OF FRONTHAUL SPLIT RADIO UNITS

CROSS REFERENCE

The present Application for Patent claims the benefit of U.S. Provisional Patent Application No. 62/968,830 by COOPER et al., entitled "METHODS AND APPARATUS FOR FLEXIBLE CONFIGURATION OF FRONTHAUL SPLIT RADIO UNITS," filed Jan. 31, 2020, assigned to the assignee hereof, and expressly incorporated by reference herein.

FIELD OF TECHNOLOGY

The following relates generally to wireless communications and more specifically to methods and apparatus for flexible configuration of fronthaul split radio units.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, network access nodes, such as base stations, may have functionality that is split among multiple units. For example, a base station may include a central unit (CU), one or more distributed units (DUs) and one or more radio heads or radio units (RUs), which may allow for enhanced network functionality such as efficient coordinated multipoint (CoMP) communications techniques, multiple-input-multiple-output (MIMO) techniques, and the like. Such differences in functionality for components within a network may result in a relatively large number of different hardware configurations for a network equipment manufacturer, as well as the network operator. Thus, efficient management of different network components that have different functionality is desirable in order to achieve lower cost of network elements development and enhance network management and deployments.

SUMMARY

The described techniques relate to improved methods, systems, devices, and apparatuses that support flexible configuration of fronthaul split radio units. Various aspects of the disclosure provide for radio units (RUs), distributed units (DUs), or combinations thereof, in which a single hardware configuration may be configured to implement different functions for radio frequency (RF) and baseband processing at a base station. In some cases, functionality for a RU or DU may be identified, and the RU or DU may be configured to implement the functionality through run-time configuration or boot image options to implement a particular set of functions that may be needed for a particular cell or deployment. In some cases, a RU may be configured to perform RF functions only, RF functions and at least one baseband function, or RF and all baseband functions. In some cases, a DU may be coupled between a RU and a central unit of a base station, and may perform medium access control (MAC) functions only, MAC functions and at least one baseband function, or MAC functions and all baseband functions. In some cases, a RU or DU may be reconfigured following an initial configuration to perform different functions following the reconfiguration.

A method of wireless communication at a radio unit of a wireless communications system is described. The method may include identifying configuration information that includes a first set of functions to be performed at the radio unit, where the radio unit has a capability to perform radio frequency functions, baseband functions, medium access control functions, or any combinations thereof, and the first set of functions includes at least one radio frequency function, configuring the first set of functions at the radio unit based on the identifying, where the first set of functions includes a first set of downlink functions and a first set of uplink functions, receiving, from a central unit or a distributed unit that performs a second set of functions, downlink signals that are to be processed according to the first set of downlink functions, processing the downlink signals according to the first set of downlink functions to generate a downlink communication, and transmitting the downlink communication to at least one UE.

An apparatus for wireless communication at a radio unit of a wireless communications system is described. The apparatus may include a processor, memory coupled with the processor, and instructions stored in the memory. The instructions may be executable by the processor to cause the apparatus to identify configuration information that includes a first set of functions to be performed at the radio unit, where the radio unit has a capability to perform radio frequency functions, baseband functions, medium access control functions, or any combinations thereof, and the first set of functions includes at least one radio frequency function, configure the first set of functions at the radio unit based on the identifying, where the first set of functions includes a first set of downlink functions and a first set of uplink functions, receive, from a central unit or a distributed unit that performs a second set of functions, downlink signals that are to be processed according to the first set of downlink functions, process the downlink signals according to the first set of downlink functions to generate a downlink communication, and transmit the downlink communication to at least one UE.

Another apparatus for wireless communication at a radio unit of a wireless communications system is described. The apparatus may include means for identifying configuration information that includes a first set of functions to be performed at the radio unit, where the radio unit has a capability to perform radio frequency functions, baseband functions, medium access control functions, or any combinations thereof, and the first set of functions includes at least one radio frequency function, configuring the first set of functions at the radio unit based on the identifying, where the first set of functions includes a first set of downlink functions and a first set of uplink functions, receiving, from a central unit or a distributed unit that performs a second set of functions, downlink signals that are to be processed according to the first set of downlink functions, processing the downlink signals according to the first set of downlink functions to generate a downlink communication, and transmitting the downlink communication to at least one UE.

A non-transitory computer-readable medium storing code for wireless communication at a radio unit of a wireless communications system is described. The code may include instructions executable by a processor to identify configuration information that includes a first set of functions to be performed at the radio unit, where the radio unit has a capability to perform radio frequency functions, baseband functions, medium access control functions, or any combinations thereof, and the first set of functions includes at least one radio frequency function, configure the first set of functions at the radio unit based on the identifying, where the first set of functions includes a first set of downlink functions and a first set of uplink functions, receive, from a central unit or a distributed unit that performs a second set of functions, downlink signals that are to be processed according to the first set of downlink functions, process the downlink signals according to the first set of downlink functions to generate a downlink communication, and transmit the downlink communication to at least one UE.

Some examples of the method, apparatuses, and non-transitory computer-readable medium described herein may further include operations, features, means, or instructions for receiving radio frequency signals from the UE in a set of wireless resources associated with an uplink allocation granted to the UE for an uplink communication, processing the received radio frequency signals according to the first set of uplink functions to generate processed uplink signals, and providing the processed uplink signals to the central unit or the distributed unit to be processed according to the second set of functions.

In some examples of the method, apparatuses, and non-transitory computer-readable medium described herein, the first set of functions includes only the radio frequency functions and where the downlink signals and the processed uplink signals include digital I/Q samples. In some examples of the method, apparatuses, and non-transitory computer-readable medium described herein, the second set of functions may be performed at the distributed unit and include the baseband functions and the medium access control functions. In some examples of the method, apparatuses, and non-transitory computer-readable medium described herein, the first set of downlink functions include a digital-to-analog conversion function and a transmit analog beamforming function, and the first set of uplink functions include a receive analog beamforming function and an analog-to-digital conversion function.

In some examples of the method, apparatuses, and non-transitory computer-readable medium described herein, the first set of functions includes the radio frequency functions and a first subset of baseband functions, and where the downlink signals and the processed uplink signals include digitally precoded tones. In some examples of the method, apparatuses, and non-transitory computer-readable medium described herein, the second set of functions may be performed at the distributed unit and include a second subset of baseband functions and the medium access control functions. In some examples of the method, apparatuses, and non-transitory computer-readable medium described herein, the first subset of baseband functions include Fourier transform processing and cyclic prefix addition for the downlink signals, and include cyclic prefix removal and Fourier transform processing for uplink signals.

In some examples of the method, apparatuses, and non-transitory computer-readable medium described herein, the first set of functions includes the radio frequency functions and a first subset of baseband functions, and where the downlink signals and the processed uplink signals include non-precoded tones. In some examples of the method, apparatuses, and non-transitory computer-readable medium described herein, the first subset of baseband functions include Fourier transform processing, cyclic prefix addition, resource mapping, and digital precoding for the downlink signals, and include cyclic prefix removal, Fourier transform processing, and resource demapping processing for uplink signals. In some examples of the method, apparatuses, and non-transitory computer-readable medium described herein, the first set of functions includes the radio frequency functions and a first subset of baseband functions, and where the downlink signals include encoded bits and the processed uplink signals include log likelihood ratio (LLR) metrics.

In some examples of the method, apparatuses, and non-transitory computer-readable medium described herein, the first subset of baseband functions include Fourier transform processing, cyclic prefix addition, resource mapping, digital precoding, layer mapping, and modulation for the downlink signals, and include cyclic prefix removal, Fourier transform processing, resource demapping processing, channel estimation and equalization, inverse discrete Fourier transform (IDFT) processing, and demodulation for uplink signals.

In some examples of the method, apparatuses, and non-transitory computer-readable medium described herein, the first set of functions includes the radio frequency functions and a first subset of baseband functions, and where the downlink signals and the processed uplink signals include digital information bits. In some examples of the method, apparatuses, and non-transitory computer-readable medium described herein, the first subset of baseband functions include Fourier transform processing, cyclic prefix addition, resource mapping, digital precoding, layer mapping, modulation, scrambling, rate-matching, and coding for the downlink signals, and include cyclic prefix removal, Fourier transform processing, resource demapping processing, channel estimation and equalization, inverse discrete Fourier transform (IDFT) processing, demodulation, descrambling, de-rate-matching, and decoding for uplink signals.

Some examples of the method, apparatuses, and non-transitory computer-readable medium described herein may further include operations, features, means, or instructions for receiving updated configuration information that provides a reconfigured first set of functions that include more or fewer baseband functions that may be to be performed at the radio unit, reconfiguring the first set of functions at the radio unit based on the updated configuration information, and communicating with the UE and the central unit or distributed unit using the reconfigured first set of functions.

In some examples of the method, apparatuses, and non-transitory computer-readable medium described herein, the radio unit hosts baseband and radio frequency functions, and may be collocated with the distributed unit that hosts medium access control and radio link control functions.

In some examples of the method, apparatuses, and non-transitory computer-readable medium described herein, the radio unit hosts baseband and radio frequency functions, and medium access control and radio link control functions may be split between the radio unit and the central unit, and where a set of radio units support coordinated multipoint (CoMP) communications where same transport blocks may be transmitted by the set of radio units to the UE with non-coherent precoding, and the set of radio units receive and independently decode uplink communications from the UE. In some examples of the method, apparatuses, and non-transitory computer-readable medium described herein, the radio unit hosts radio frequency functions, the distributed unit hosts baseband functions, medium access control, and radio link control functions, and where a set of radio units support coordinated multipoint (CoMP) communications with coherent or non-coherent precoding.

In some examples of the method, apparatuses, and non-transitory computer-readable medium described herein, the radio unit hosts radio frequency functions and baseband functions including precoding and combining, and the distributed unit hosts medium access control and radio link control functions, and where a set of radio units support massive multiple-input-multiple-output (M-MIMO) communications a set of UEs.

A method of wireless communication at a distributed unit in a wireless communications system is described. The method may include identifying configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configuring the second set of functions at the distributed unit based on the identifying, where the second set of functions includes a second set of downlink functions and a second set of uplink functions, receiving, from a central unit, downlink data that is to be processed according to the second set of downlink functions, processing the downlink data according to the second set of downlink functions to generate downlink signals for processing and transmission by the radio unit, and communicating the downlink signals to the radio unit for processing according to the first set of functions and transmission to the UE.

An apparatus for wireless communication at a distributed unit in a wireless communications system is described. The apparatus may include a processor, memory coupled with the processor, and instructions stored in the memory. The instructions may be executable by the processor to cause the apparatus to identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configure the second set of functions at the distributed unit based on the identifying, where the second set of functions includes a second set of downlink functions and a second set of uplink functions, receive, from a central unit, downlink data that is to be processed according to the second set of downlink functions, process the downlink data according to the second set of downlink functions to generate downlink signals for processing and transmission by the radio unit, and communicate the downlink signals to the radio unit for processing according to the first set of functions and transmission to the UE.

Another apparatus for wireless communication at a distributed unit in a wireless communications system is described. The apparatus may include means for identifying configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configuring the second set of functions at the distributed unit based on the identifying, where the second set of functions includes a second set of downlink functions and a second set of uplink functions, receiving, from a central unit, downlink data that is to be processed according to the second set of downlink functions, processing the downlink data according to the second set of downlink functions to generate downlink signals for processing and transmission by the radio unit, and communicating the downlink signals to the radio unit for processing according to the first set of functions and transmission to the UE.

A non-transitory computer-readable medium storing code for wireless communication at a distributed unit in a wireless communications system is described. The code may include instructions executable by a processor to identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configure the second set of functions at the distributed unit based on the identifying, where the second set of functions includes a second set of downlink functions and a second set of uplink functions, receive, from a central unit, downlink data that is to be processed according to the second set of downlink functions, process the downlink data according to the second set of downlink functions to generate downlink signals for processing and transmission by the radio unit, and communicate the downlink signals to the radio unit for processing according to the first set of functions and transmission to the UE.

Some examples of the method, apparatuses, and non-transitory computer-readable medium described herein may further include operations, features, means, or instructions for receiving uplink signals from the radio unit, processing the received uplink signals according to the second set of uplink functions to generate uplink data, and communicating the uplink data to the central unit.

In some examples of the method, apparatuses, and non-transitory computer-readable medium described herein, the uplink signals from the radio unit and the downlink signals to the radio unit include digital I/Q samples, and the second set of functions includes all baseband functions and medium access control functions.

In some examples of the method, apparatuses, and non-transitory computer-readable medium described herein, the downlink signals and the uplink signals include digitally precoded tones, and where the second set of functions include a subset of baseband functions and the medium access control functions, and where the radio unit performs one or more baseband functions that may be not included in the subset of baseband functions.

In some examples of the method, apparatuses, and non-transitory computer-readable medium described herein, the downlink signals and the uplink signals include digital information bits, and where the second set of functions include only the medium access control functions, and where the radio unit performs all of the baseband functions.

Some examples of the method, apparatuses, and non-transitory computer-readable medium described herein may further include operations, features, means, or instructions for receiving updated configuration information that provides a reconfigured second set of functions that include more or fewer baseband functions that may be to be performed at the distributed unit, reconfiguring the second set of functions at the distributed unit based on the updated configuration information, and communicating with the radio unit and the central unit using the reconfigured second set of functions.

DETAILED DESCRIPTION

Figure 1:
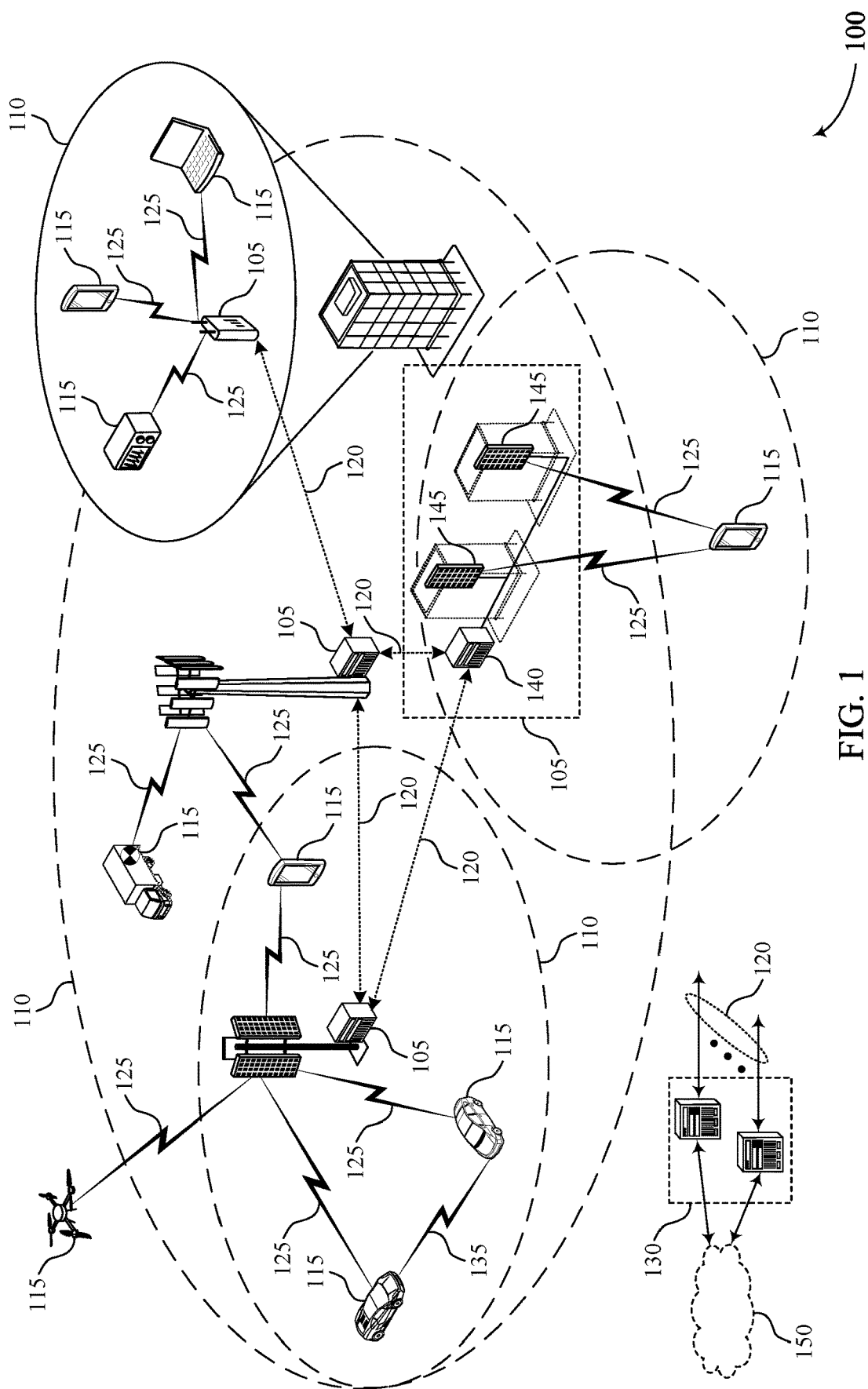
FIG. 1 illustrates an example of a system for wireless communications that supports methods and apparatus for flexible configuration of fronthaul split radio units in accordance with aspects of the present disclosure.

Aspects of the present disclosure provide for flexible configurations of network components in a radio access network (RAN), such as a centralized or cloud RAN (C-RAN). In some deployments, network access nodes, such as base stations (e.g., gNBs in 5G networks), may have functionality that is split among multiple units. For example, a base station may include a central unit (CU) and one or more radio heads or radio units (RUs), which may allow for enhanced network functionality such as efficient coordinated multipoint (CoMP) communications techniques, multiple-input-multiple-output (MIMO) techniques, and the like. In some cases, functionality of a base station may be divided among a CU, one or more distributed units (DUs), and one or more RUs, where communications between a CU and a DU may be referred to as midhaul communications and communications between a DU and a RU may be referred to as fronthaul communications. In different types of deployments, it may be beneficial to have certain functionality implemented differently between DUs and RUs.

For example, some network operators may deploy RANs that use a disaggregated RAN infrastructure architecture. In a disaggregated architecture, the RAN may be split into three areas of functionality corresponding to CU functions, DU functions, and RU functions. The split of functionality between the CU, DU and RU is flexible and as such gives rise to numerous permutations of different functionalities depending upon which functions (e.g., medium access control (MAC) functions, baseband functions, radio frequency (RF) functions, and any combinations thereof) are performed at the CU, DU, and RU. In traditional deployments that use different hardware configurations for different functionalities, such differences in functionality for components within a network may result in a relatively large number of different hardware configurations for a network operator. Such different hardware configurations require significant overhead to develop, manufacture, deploy and maintain, and also provide very little flexibility to an communication equipment developer/manufacturer or a network operator after deployment.

Various techniques as discussed herein provide for flexible configuration of fronthaul split RUs and DUs. Various aspects of the disclosure provide for RUs, DUs, or combinations thereof, in which a single hardware configuration may be configured to implement different functions for RF and baseband processing. In some cases, functionality for a RU or DU may be identified, and the RU or DU may be configured through run-time configuration or a boot image option to implement a particular set of functions that may be needed for a particular cell or deployment. In some cases, a RU may be configured to perform RF functions only, RF functions and at least one baseband function, or RF and all baseband functions. In some cases, a DU may be coupled between a RU and a CU, and may perform MAC functions only, MAC functions and at least one baseband function, or MAC functions and all baseband functions. In some cases, a RU or DU may be reconfigured following an initial configuration to perform different functions following the reconfiguration.

Such techniques may allow a communication equipment developer/manufacturer or network operator to efficiently deploy and configure portions of a RAN that may use disaggregated infrastructure. Further, common hardware components may allow for more efficient development, manufacturing and maintenance and scaling of a network, and thus allow for efficient and economical development of communication network elements (such as RU and DU), network deployments and operations. Further, reconfigurability of RUs and DUs may allow an operator to adjust a network deployment or move equipment within a network in an efficient and cost effective manner.

Aspects of the disclosure are initially described in the context of wireless communications systems. Examples of functionality splits and RU/DU implementations for different functionality are then described. Aspects of the disclosure are further illustrated by and described with reference to apparatus diagrams, system diagrams, and flowcharts that relate to methods and apparatus for flexible configuration of fronthaul split radio units.

FIG. 1 illustrates an example of a wireless communications system 100 that supports methods and apparatus for flexible configuration of fronthaul split radio units in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or 5G New Radio (5G NR) network. In some examples, the wireless communications system 100 may support enhanced broadband communications, ultra-reliable (e.g., mission critical) communications, low latency communications, communications with low-cost and low-complexity devices, or any combination thereof. In some examples, the wireless communications system 100 may be a public network or private network, such as enterprise, office building, or Industrial IOT (IIOT) networks.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130 (e.g., a 5G core network (5GC)), or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as one or multiple CUs or access network entity 140, which may be an example of an access node controller (ANC). Each CU may communicate with the UEs 115 through one or more other access network transmission entities 145, such as a DU and RU (which may be referred to as radio heads, smart radio heads, or transmission/reception points (TRPs)). Each access network transmission entity 145 may include one or more antenna panels. In some configurations, various functions of each access network entity 140 or base station 105 may be distributed across various network devices (e.g., CUs, DUs, RUs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels in baseband processing, and transmitted through an RF front end.

In various aspects, one or more base stations 105 may include one or more CUs, DU, and RUs, which may be used for communications with one or more UEs 115. In some cases, RUs may be implemented using a hardware configuration that may be configured to implement different functions for RF and baseband processing. Similarly, DUs may be implemented using a hardware configuration that may be configured to implement different functions for MAC and baseband processing. In some cases, functionality for a RU or DU may be identified, and the RU or DU may be configured to implement the functionality through run-time configuration or boot image options to implement a particular set of functions that are needed for a particular cell or deployment. In some cases, a RU may be configured to perform RF functions only, RF functions and at least one baseband function, or RF and all baseband functions. In some cases, a DU may be coupled between a RU and a central unit of a base station, and may perform MAC functions only, MAC functions and at least one baseband function, or MAC functions and all baseband functions. In some cases, a RU or DU may be reconfigured following an initial configuration to perform different functions following the reconfiguration.

Figure 2:
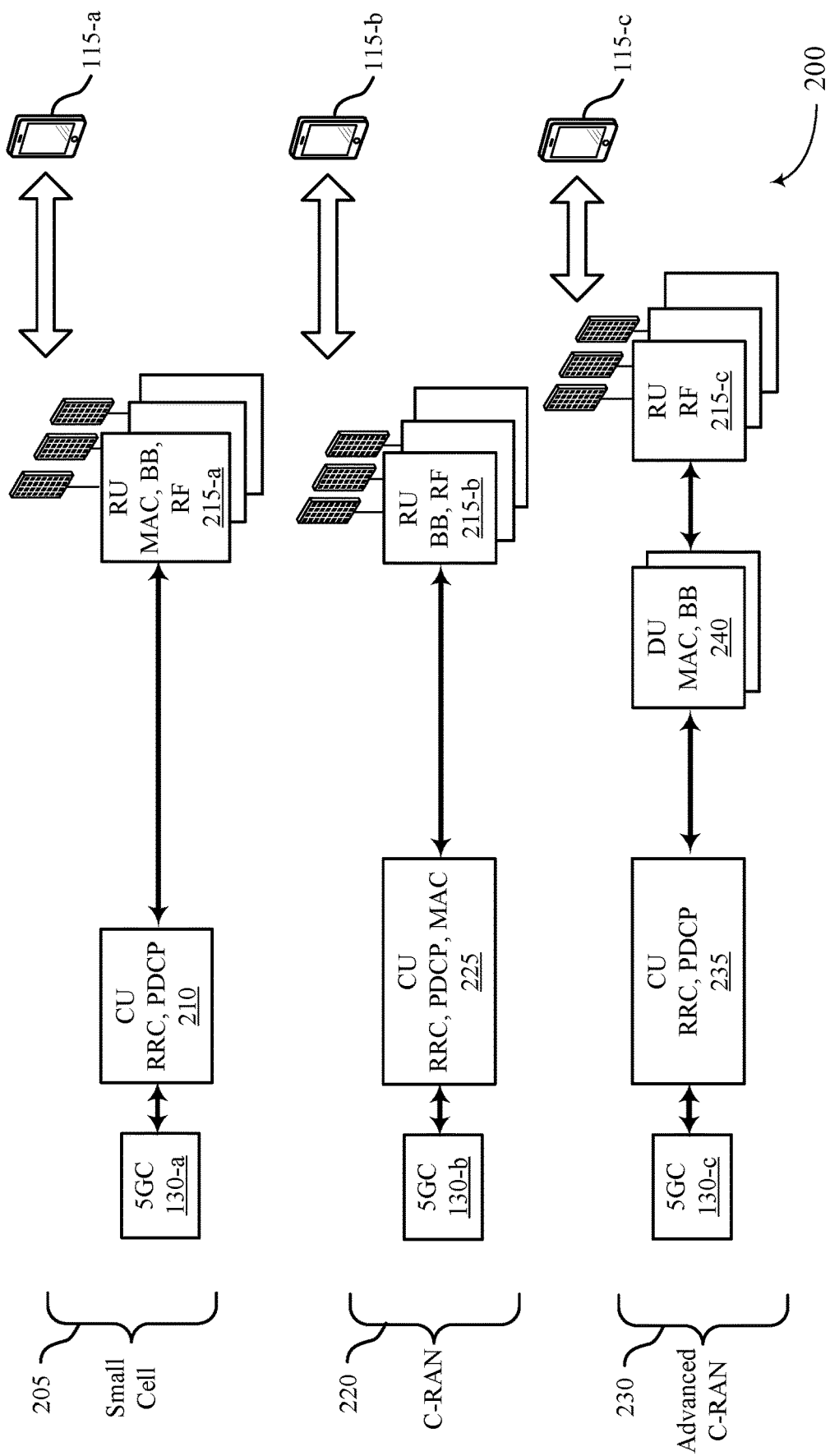
FIG. 2 illustrates exemplary functionality splits between central units (CUs), distributed units (DUs) and radio units (RUs) in accordance with aspects of the present disclosure.

FIG. 2 illustrates exemplary functionality splits 200 that support methods and apparatus for flexible configuration of fronthaul split radio units in accordance with aspects of the present disclosure. In some examples, exemplary functionality splits 200 may implement aspects of wireless communication system 100. In the examples of FIG. 2, different components of a base station or gNB may perform different functions for wireless communications with UEs 115.

The particular functionality performed by different components may depend upon the deployment. For example, a small cell deployment 205 may be implemented with a CU 210 coupled between a 5GC 130-*a* and one or more RUs 215-*a*, where the CU 210 performs radio resource control (RRC) and packet data convergence protocol (PDCP) functions. In such deployments, RU(s) 215-*a* may perform MAC, baseband (BB), and RF functionality. The RU(s) 215-*a* may communicate with UE 115-*a* (and other UEs), and may exchange PDCP protocol data units (PDUs) with the CU 210. In some cases, the RU(s) 215-*a* may include hardware that allows for performance of the MAC, BB, and RF functionality, and may be configured to perform such functions (e.g., through a run-time configuration or through a boot image option that is selected when starting up the RU 215-*a*).

In other cases, a relatively simple C-RAN deployment 220 may be implemented with a CU 225 coupled between 5GC 130-*b* and one or more RUs 215-*b*. In this deployment, the CU 225 may perform RRC, PDCP, and MAC functions, and the RU(s) 215-*b* may perform BB and RF functions. The RU(s) 215-*b* may communicate with UE 115-*b*, and may exchange transport blocks (TBs) with the CU 225. In some cases, the RU(s) 215-*b* may include the same hardware as RU 215-*a*, that allows for performance of the BB and RF functionality, and may be configured to perform such functions (e.g., through a run-time configuration or through a boot image option that is selected when starting up the RU 215-*b*).

In further cases, a more advanced C-RAN deployment 230 may be implemented with a CU 235 coupled between 5GC 130-*c* and one or more DUs 240. In this deployment, the CU 235 may perform RRC and PDCP functions, and DU(s) 240 may perform MAC and BB functions. The DU(s) 240 may be coupled between CU 235 and one or more RUs 215-*c*, where the RU(s) 215-*c* may perform RF functions. The RU(s) 215-*c* may communicate with UE 115-*c* using, in some cases, CoMP or M-MIMO techniques. In some cases, the RU(s) 215-*c* may exchange in-phase/quadrature (I/Q) digital samples with DU(s) 240, and the DU(s) 240 may exchange PDCP PDUs with CU 235. In some cases, the RU(s) 215-*c* may include the same hardware as RU 215-*a* and RU 215-*b*, that allows for performance of the RF functionality, and may be configured to perform such functions (e.g., through a run-time configuration or through a boot image option that is selected when starting up the RU(s) 215-*c*). In some cases, the DU(s) 240 may have a hardware configuration that can accommodate multiple different fronthaul splits, and may also be configured to perform particular functions as desired for a deployment (e.g., through a run-time configuration or through a boot image that is selected when starting up the DU(s) 240).

In some cases a RU 215 may be configured for functionality that includes, for example, RF only; RF and fast Fourier transform (FFT); RF, FFT, and precoding; or RF, FFT, precoding, demodulation, and decoding. In a similar manner, the DU 240 may be configured for functionality that includes, for example, decoding only; decoding and demodulation; decoding, demodulation, and FFT; or decoding, demodulation, FFT, and precoding. Thus, various aspects provide a common and flexible RU and DU architecture that may address several different deployment scenarios and accommodate multiple functionality splits. Various different functionality splits may include, for example, different combinations of baseband processing splits, such as illustrated in FIGS. 3 through 7.

Figure 3:
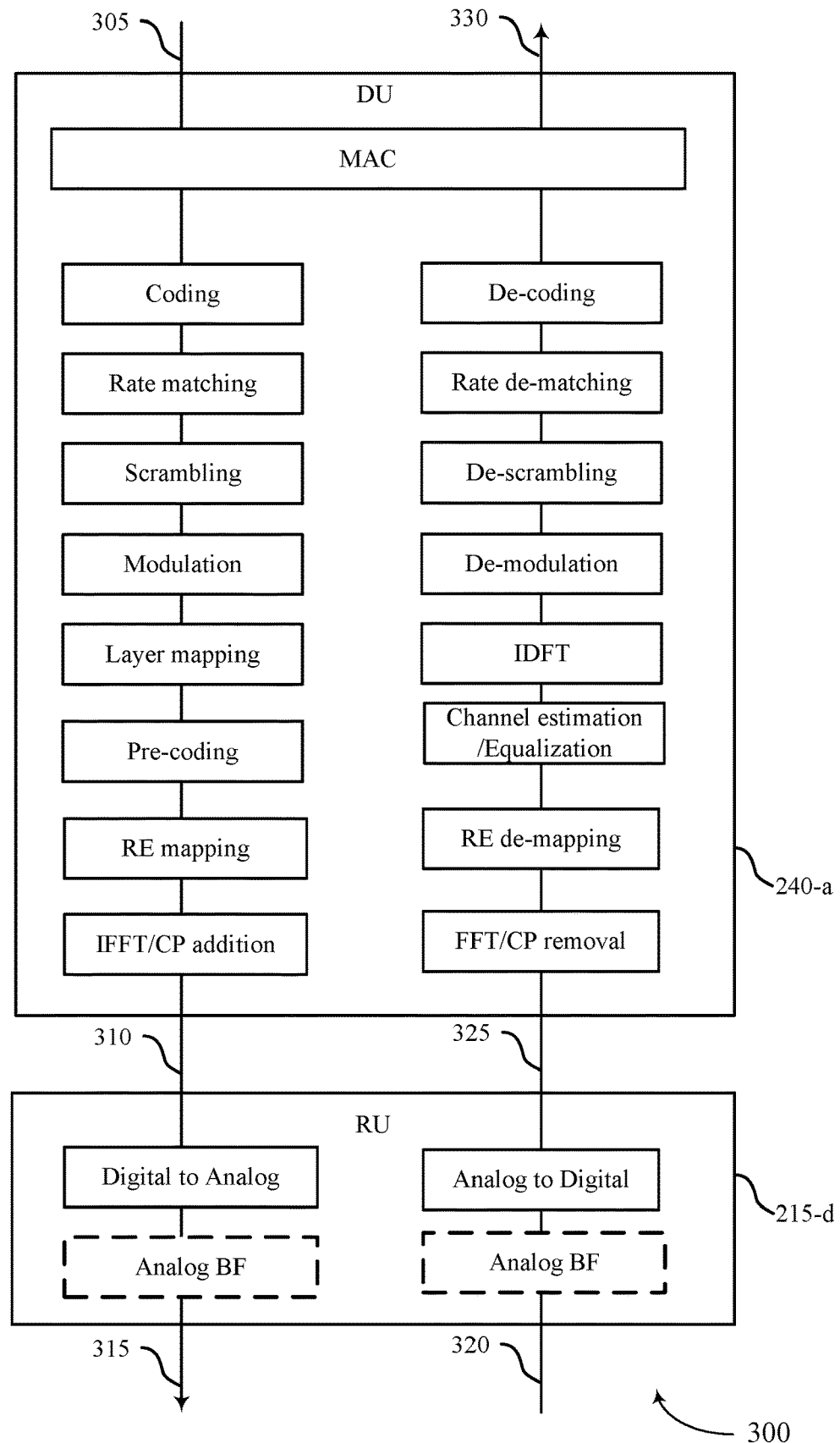
FIGS. 3 through 7 illustrate examples of RU/DU functionality splits that support methods and apparatus for flexible configuration of fronthaul split radio units in accordance with aspects of the present disclosure.

FIG. 3 illustrates an example of a RU/DU functionality split 300 that supports methods and apparatus for flexible configuration of fronthaul split radio units in accordance with aspects of the present disclosure. In some examples, RU/DU functionality split 300 may implement aspects of wireless communication systems 100.

In this example, a RU 215-*d* may implement RF functions, and a DU 240-*a* may implement baseband and MAC functions. The DU 240-*a* may, in this example, receive downlink data 305 to be transmitted (e.g., PDCP PDUs), and may perform MAC processing, coding, rate-matching, scrambling, modulation, layer mapping, precoding, resource element (RE) mapping, and IFFT/CP addition. The DU 240-*a* may output digital I/Q samples 310 to the RU 215-*d*, which may perform RF processing of digital-to-analog conversion and analog beamforming, to output analog signals 315 to an RF front end (e.g., one or more RF transmit chains) and one or more antennas.

For uplink communications, the RU 215-*d* may receive uplink signals 320 and perform analog beamforming and analog-to-digital conversion of received signals. The RU 215-*d* may provide digital I/Q samples 325 to the DU 240-*a*, which may perform FFT/CP removal, RE de-mapping, channel estimation and equalization, inverse discrete Fourier transform (IDFT), demodulation, de-scrambling, rate de-matching, decoding, and MAC processing, to provide PDCP PDUs 330 to a CU or 5GC.

Figure 4:
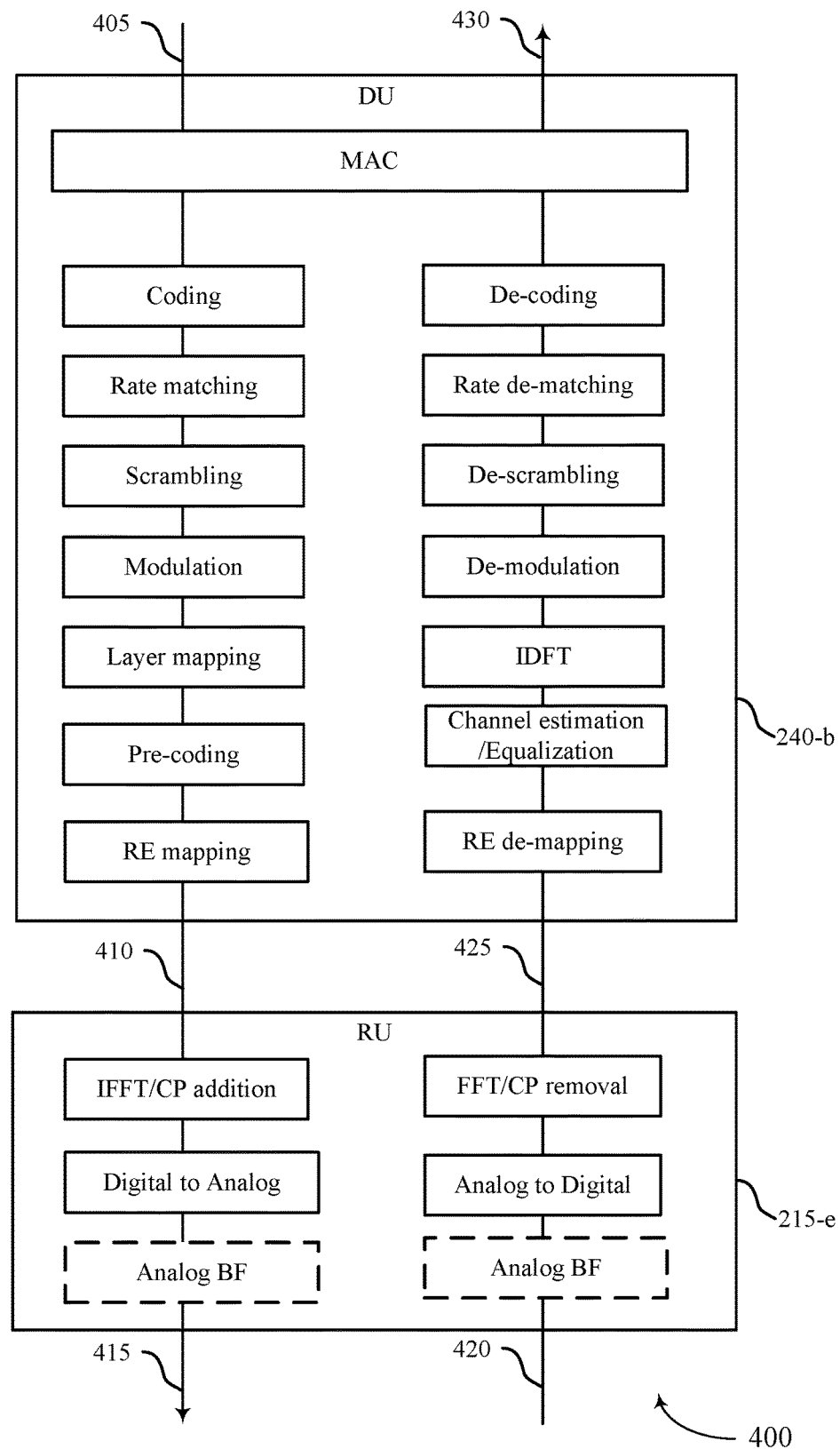

FIG. 4 illustrates an example of a RU/DU functionality split 400 that supports methods and apparatus for flexible configuration of fronthaul split radio units in accordance with aspects of the present disclosure. In some examples, RU/DU functionality split 400 may implement aspects of wireless communication system 100.

In this example, a RU 215-*e* may implement RF functions and some baseband functions, and a DU 240-*b* may implement remaining baseband and MAC functions. The DU 240-*b* may, in this example, receive downlink data 405 to be transmitted (e.g., PDCP PDUs), and may perform MAC processing, coding, rate-matching, scrambling, modulation, layer mapping, precoding, and RE mapping. The DU 240-*b* may output pre-coded tones 410 to the RU 215-*e*, which may perform IFFT/CP addition, and RF processing of digital-to-analog conversion and analog beamforming, to output analog signals 415 to an RF front end (e.g., one or more RF transmit chains) and one or more antennas.

For uplink communications, the RU 215-*e* may receive uplink signals 420 and perform analog beamforming, analog-to-digital conversion of received signals, and FFT/CP removal. The RU 215-*e* may provide pre-coded tones 425 to the DU 240-*b*, which may perform RE de-mapping, channel estimation and equalization, IDFT, demodulation, de-scrambling, rate de-matching, decoding, and MAC processing, to provide PDCP PDUs 430 to a CU or 5GC.

Figure 5:
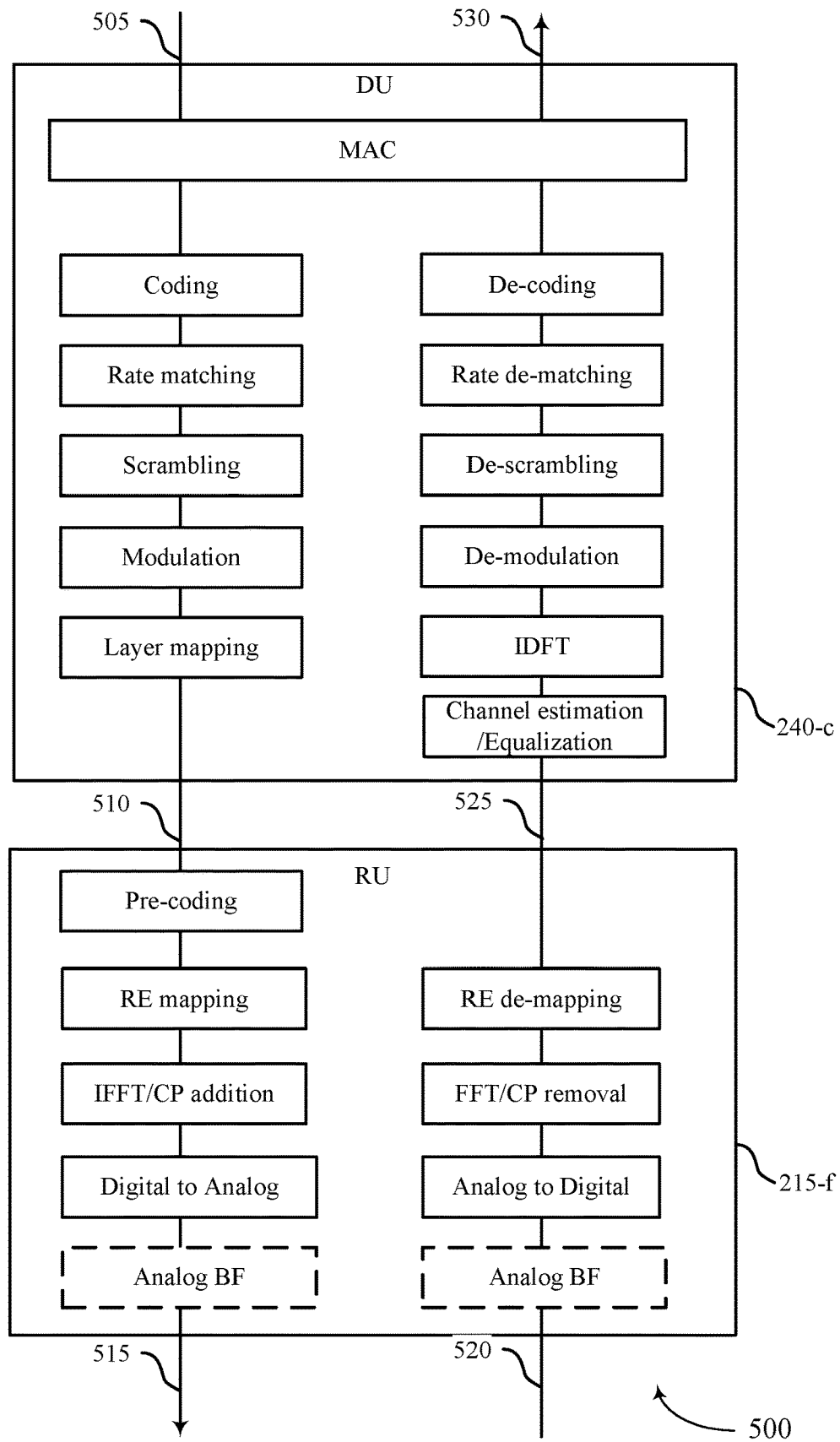

FIG. 5 illustrates an example of a RU/DU functionality split 500 that supports methods and apparatus for flexible configuration of fronthaul split radio units in accordance with aspects of the present disclosure. In some examples, RU/DU functionality split 500 may implement aspects of wireless communication system 100.

In this example, a RU 215-*f* may implement RF functions and some baseband functions, and a DU 240-*c* may implement remaining baseband and MAC functions. The DU 240-*c* may, in this example, receive downlink data 505 to be transmitted (e.g., PDCP PDUs), and may perform MAC processing, coding, rate-matching, scrambling, modulation, and layer mapping. The DU 240-*c* may output non-precoded tones (layers) 510 to the RU 215-*f*, which may perform baseband processing of precoding, RE mapping, and IFFT/CP addition, and RF processing of digital-to-analog conversion and analog beamforming, to output analog signals 515 to an RF front end (e.g., one or more RF transmit chains) and one or more antennas.

For uplink communications, the RU 215-*f* may receive uplink signals 520 and perform analog beamforming, analog-to-digital conversion of received signals, and baseband functions of FFT/CP removal and RE de-mapping. The RU 215-*f* may provide non-pre-coded tones 525 to the DU 240-*c*, which may perform channel estimation and equalization, IDFT, demodulation, de-scrambling, rate de-matching, decoding, and MAC processing, to provide PDCP PDUs 530 to a CU or 5GC.

Figure 6:
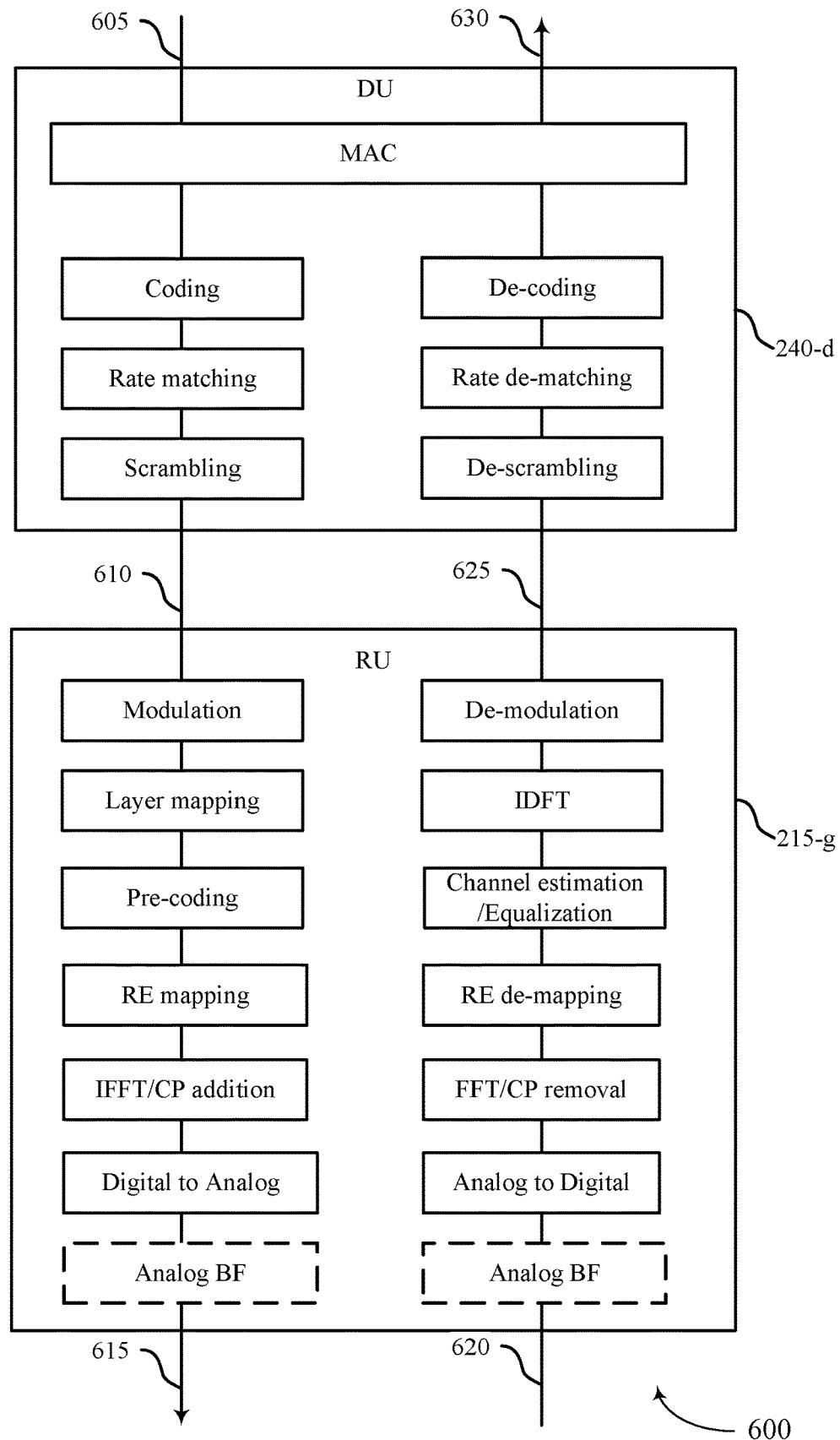

FIG. 6 illustrates an example of a RU/DU functionality split 600 that supports methods and apparatus for flexible configuration of fronthaul split radio units in accordance with aspects of the present disclosure. In some examples, RU/DU functionality split 600 may implement aspects of wireless communication system 100.

In this example, a RU 215-*g* may implement RF functions and some baseband functions, and a DU 240-*d* may implement remaining baseband and MAC functions. The DU 240-*d* may, in this example, receive downlink data 605 to be transmitted (e.g., PDCP PDUs), and may perform MAC processing, coding, rate-matching, and scrambling. The DU 240-*d* may output encoded bits 610 to the RU 215-*g*, which may perform baseband processing of modulation, layer mapping, precoding, RE mapping, and IFFT/CP addition, and RF processing of digital-to-analog conversion and analog beamforming, to output analog signals 615 to an RF front end (e.g., one or more RF transmit chains) and one or more antennas.

For uplink communications, the RU 215-*g* may receive uplink signals 620 and perform analog beamforming, analog-to-digital conversion of received signals, and baseband functions of FFT/CP removal, RE de-mapping, channel estimation and equalization, IDFT, and demodulation. The RU 215-*g* may provide LLR metrics 625 to the DU 240-*d*, which may perform de-scrambling, rate de-matching, decoding, and MAC processing, to provide PDCP PDUs 630 to a CU or 5GC.

Figure 7:
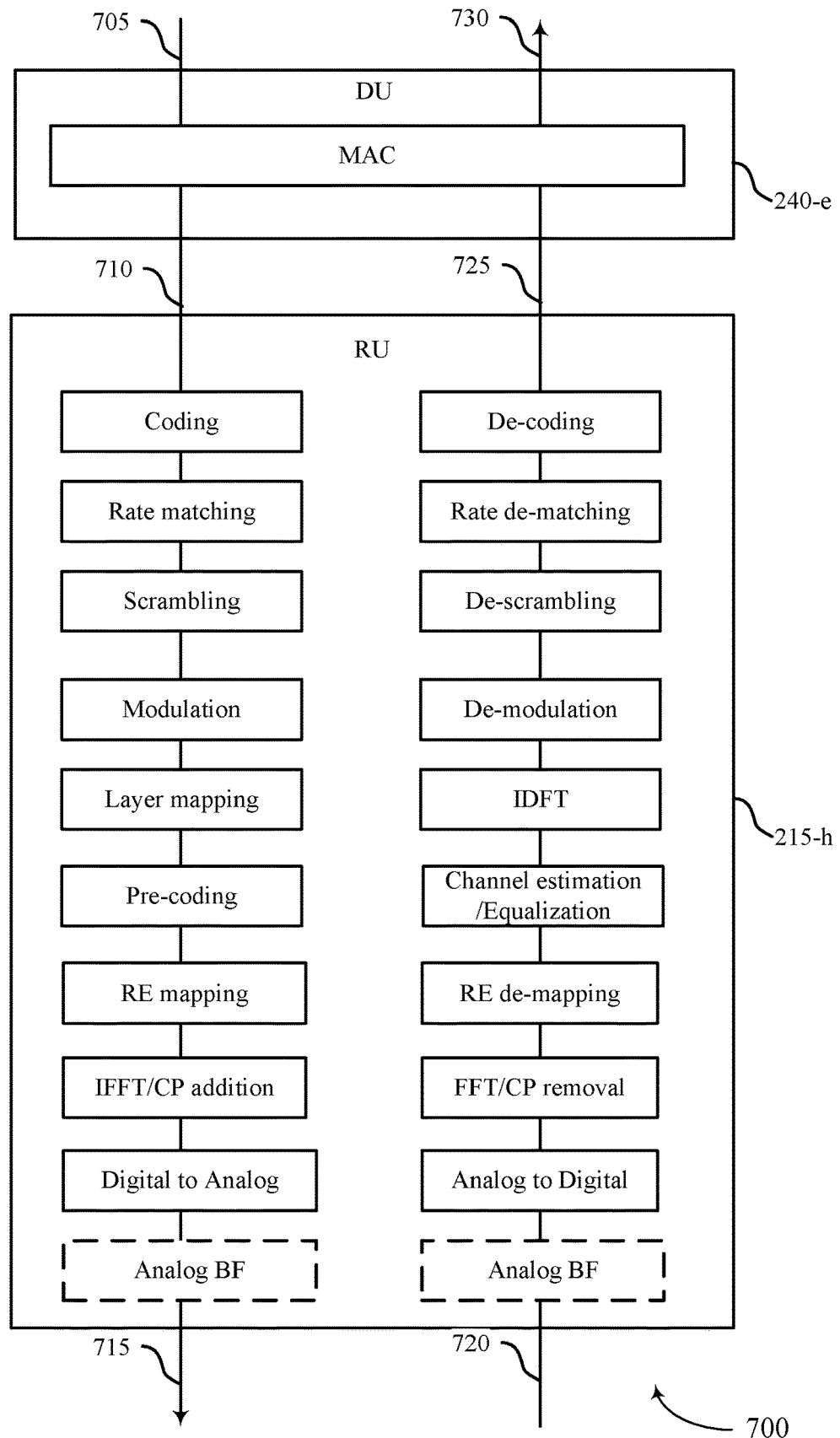

FIG. 7 illustrates an example of a RU/DU functionality split 700 that supports methods and apparatus for flexible configuration of fronthaul split radio units in accordance with aspects of the present disclosure. In some examples, RU/DU functionality split 700 may implement aspects of wireless communication system 100.

In this example, a RU 215-*h* may implement all RF functions and baseband functions, and a DU 240-*e* may implement MAC functions. The DU 240-*e* may, in this example, receive downlink data 705 to be transmitted (e.g., PDCP PDUs), and may perform MAC processing and may output information bits (e.g., transport blocks (TBs)) 710 to the RU 215-*h*, which may perform baseband processing of coding, rate-matching, scrambling, modulation, layer mapping, precoding, RE mapping, and IFFT/CP addition, and RF processing of digital-to-analog conversion and analog beamforming, to output analog signals 715 to an RF front end (e.g., one or more RF transmit chains) and one or more antennas.

For uplink communications, the RU 215-*h* may receive uplink signals 720 and perform analog beamforming, analog-to-digital conversion of received signals, and baseband functions of FFT/CP removal, RE de-mapping, channel estimation and equalization, IDFT, demodulation, de-scrambling, rate de-matching, and decoding. The RU 215-*h* may provide information bits 725 (e.g., TBs) to the DU 240-*e*, which may perform MAC processing and provide PDCP PDUs 730 to a CU or 5GC.

While the examples of FIGS. 3 through 7 illustrate various different functional splits between RUs 215, CUs, and DUs 240, other functional splits may be implemented. As discussed herein, various aspects provide that RUs 215 and DUs 240 may be configured to perform different functional splits based on a particular deployment or functionality that is desired for a network. In some cases, a runtime configuration or boot image may be used to configure or reconfigure a RU 215 or DU 240. RUs 215 and DUs 240 that are configured for different functional splits may be implemented in different deployments, some examples of which are illustrated in FIGS. 8 through 11.

Figure 8:
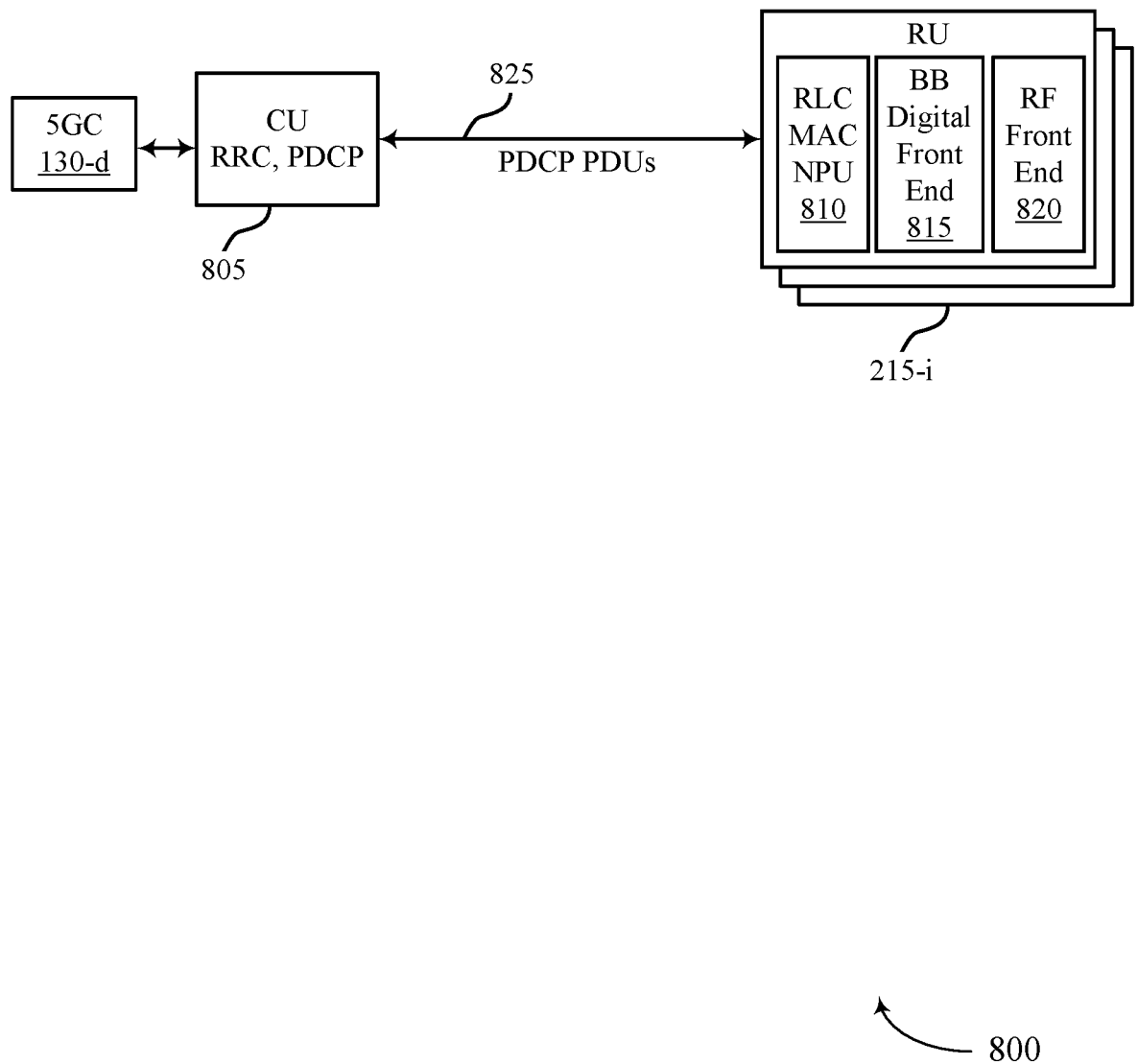
FIG. 8 illustrates an example of a small cell functionality split that supports methods and apparatus for flexible configuration of fronthaul split radio units in accordance with aspects of the present disclosure.

FIG. 8 illustrates an example of a small cell functionality split 800 that supports methods and apparatus for flexible configuration of fronthaul split radio units in accordance with aspects of the present disclosure. In some examples, small cell functionality split 800 may implement aspects of wireless communication system 100. In this example, a CU 805 may be coupled with a 5GC 130-*d* and a number of RUs 215-*i*, in a small cell deployment.

In such a deployment, the multiple RUs 215-*i* may receive PDCP PDUs 825 from CU 805 and RLC, MAC, and baseband functions may be collocated with RF functions at the RUs 215-*i*. Each of the multiple RUs 215-*i* in such cases may serve UEs in a relatively small geographic area, and provide PDCP PDUs 825 to CU 805. In this example, RUs 215-*i* may include a neural processing unit (NPU) 810 for RLC and MAC processing, a baseband digital front end 815 (e.g., a Qualcomm FSM100-based digital front end) for baseband processing, and an RF front end 820 (e.g., a Qualcomm Snapdragon 865-based RF front end). In this example, DU functionality may be collocated with the RU 215-*i* with RLC and MAC functions performed on an embedded NPU. The CU 805 in such examples may host RRC and PDCP functions (e.g., based on a Linux server).

Figure 9:
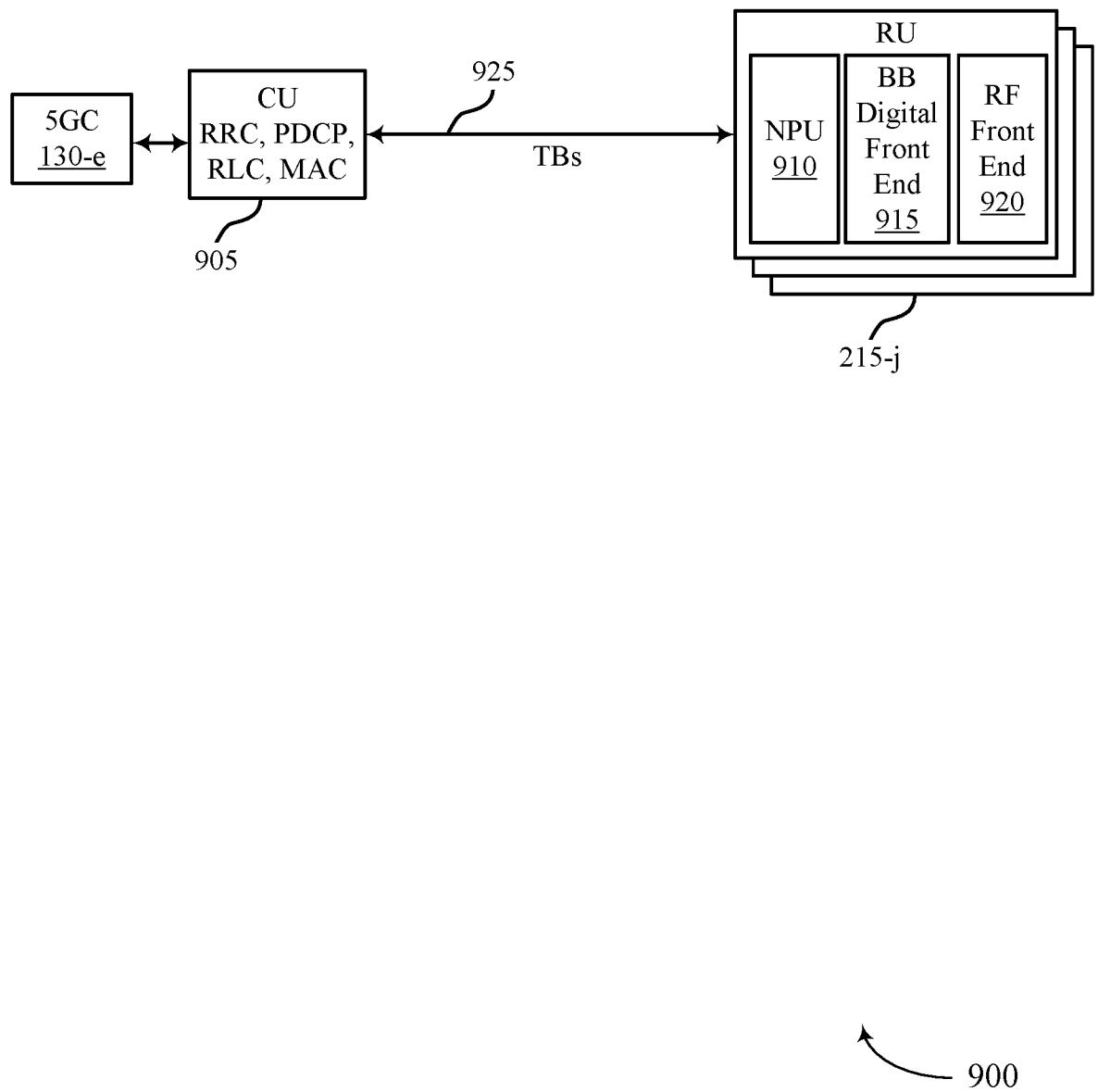
FIG. 9 illustrates an example of a centralized radio access network (c-RAN) functionality split that supports methods and apparatus for flexible configuration of fronthaul split radio units in accordance with aspects of the present disclosure.

FIG. 9 illustrates an example of a centralized RAN functionality split 900 that supports methods and apparatus for flexible configuration of fronthaul split radio units in accordance with aspects of the present disclosure. In some examples, centralized RAN functionality split 900 may implement aspects of wireless communication system 100. In this example, a CU 905 may be coupled with a 5GC 130-*e* and a number of RUs 215-*j*, in a C-RAN deployment with baseband processing collocated with RF processing at RUs 215-*j*.

In such a deployment, the multiple RUs 215-*j* may receive TBs 925 from CU 905 which may perform RRC, PDCP, RLC, and MAC functions. The RUs 215-*j* may perform baseband functions and RF functions. Each of the multiple RUs 215-*j* in such cases may serve UEs and may provide CoMP with non-coherent precoding of downlink transmissions, and provide received TBs 925 to CU 905. In this example, RUs 215-*j* may include an optional NPU 910 for baseband processing (e.g., for decoding), a baseband digital front end 915 for baseband processing, and an RF front end 920. In this example, DU functionality may be split between the RUs 215-*j* and CU 905. The CU 905 in such examples may host RRC, PDCP, RLC, and MAC functions (e.g., based on a Linux server). In such examples, for downlink communications, multiple RUs 215-*j* may transmit the same bits/TBs over the air, and receiving UEs may benefit from increased receive power and diversity. For uplink transmissions, the multiple RUs 215-*j* may independently decode uplink communications from the same UE to enhance the likelihood of successful decoding of UE communications.

Figure 10:
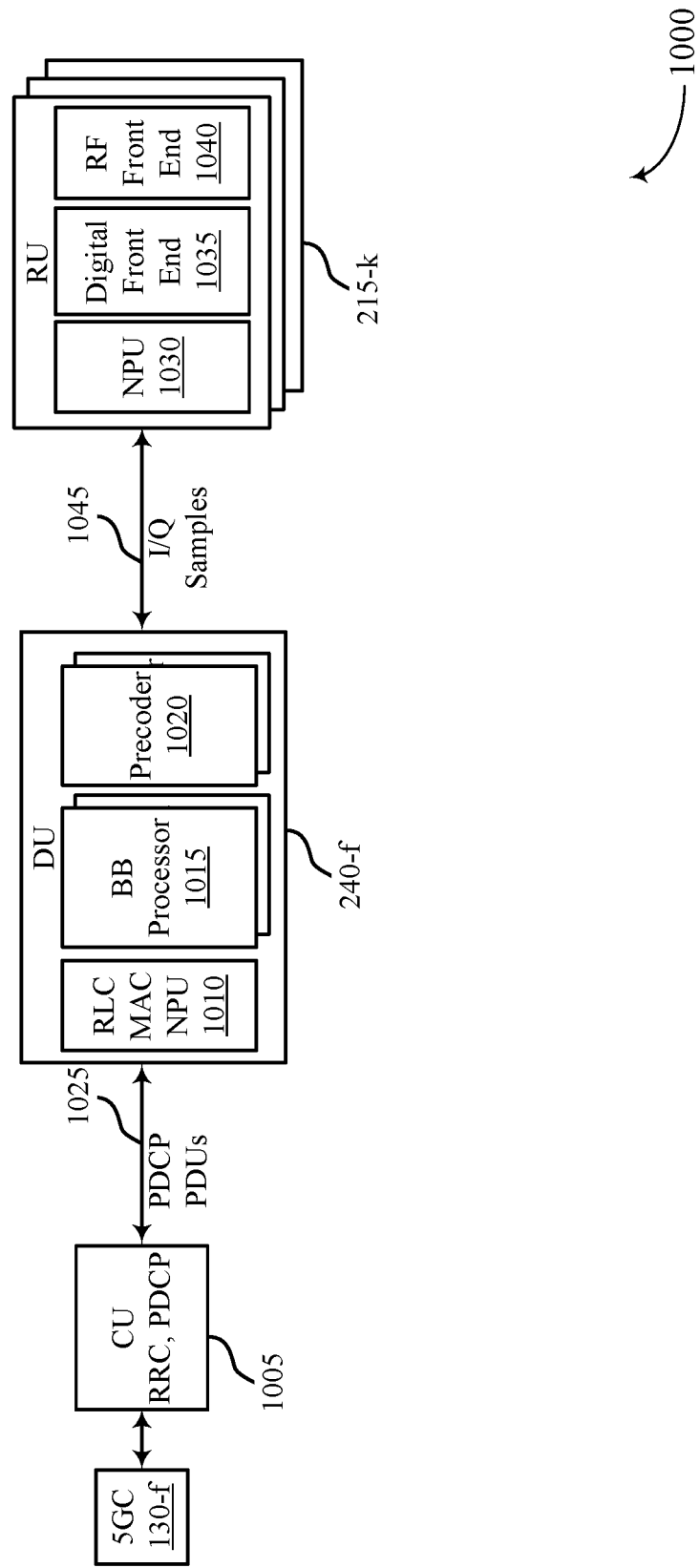
FIG. 10 illustrates an example of an advanced c-RAN functionality split supporting CoMP in accordance with aspects of the present disclosure.

FIG. 10 illustrates an example of an advanced C-RAN functionality split supporting CoMP 1000 that supports methods and apparatus for flexible configuration of fronthaul split radio units in accordance with aspects of the present disclosure. In some examples, advanced c-RAN functionality split supporting CoMP 1000 may implement aspects of wireless communication system 100. In this example, a CU 1005 may be coupled with a 5GC 130-*f* and a DU 240-*f*. The DU 240-*f* may be coupled with a number of RUs 215-*k*, in a C-RAN deployment that may provide CoMP techniques in communications with UEs.

In such a deployment, the DU 240-*f* may receive PDCP PDUs 1025 from the CU 1005, and perform RLC, MAC, and baseband functions. The DU 240-*f* may provide I/Q samples to the multiple RUs 215-*k*. The RUs 215-*k* may perform baseband functions and RF functions. Each of the multiple RUs 215-*k* in such cases may serve UEs and may provide CoMP with non-coherent precoding of downlink transmissions, and provide received PDCP PDUs 1025 to CU 1005. In this example, DU 240-*f* may include a NPU 1010 for performing RLC and MAC processing, a baseband processor 1015 for performing baseband functions, and a precoder processor 1020 that may provide processing capabilities for coherent precoding to provide CoMP communications via the RUs 215-*k*.

In this example, RUs 215-*k* may include an optional NPU 1030 and digital front end 1035 (e.g., which may not be used for baseband processing based on the configuration of the RUs 215-*k*), and an RF front end 1040. In this example, DU 240-*f* may host baseband and coherent precoding for CoMP on a Linux server (e.g., as a PCI-e card) or on an custom embedded printed circuit board with an NPU. The CU 1005 in such examples may host RRC, and PDCP functions (e.g., based on a Linux server). In some cases, such a deployment may provide CoMP without local oscillator (LO)/phase synchronization by providing non coherent precoding and combining, or with LO/phase synchronization with coherent precoding and combining.

Figure 11:
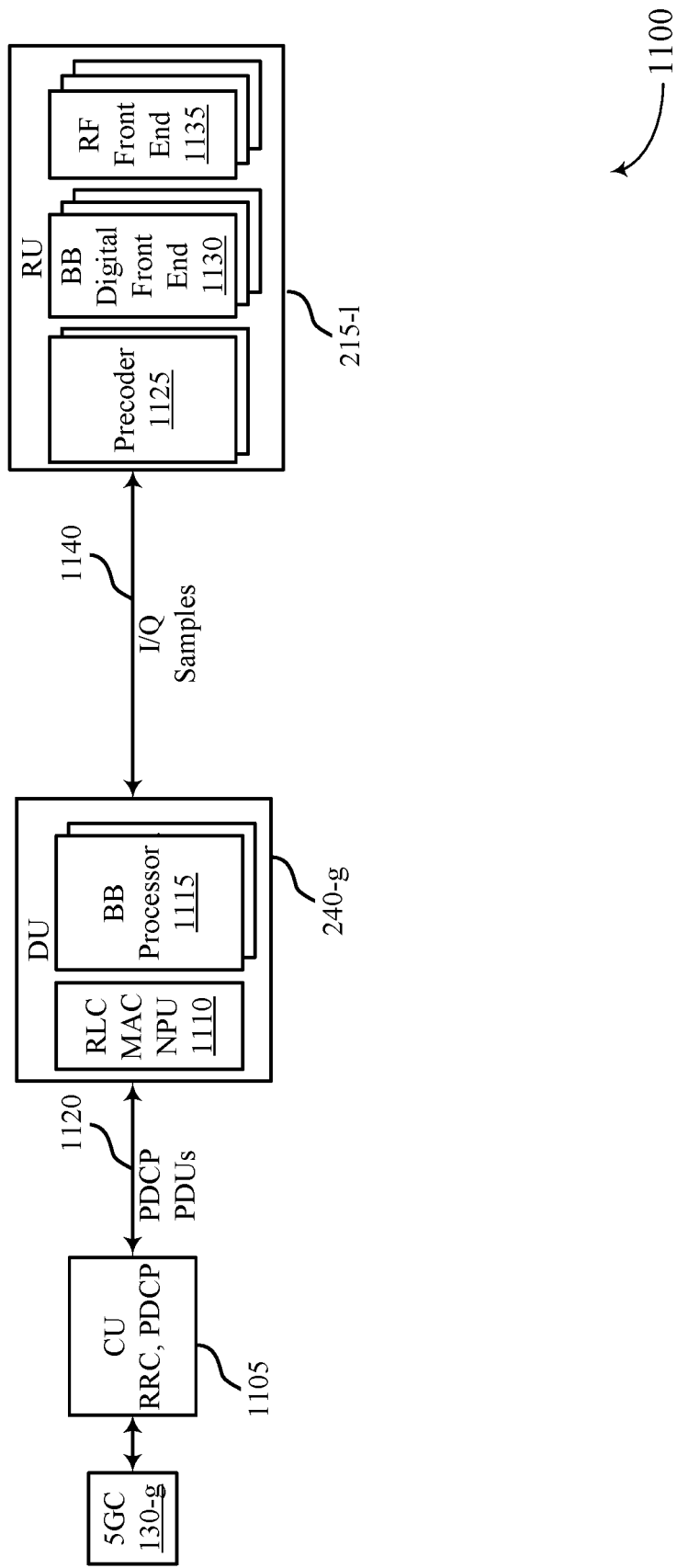
FIG. 11 illustrates an example of an advanced c-RAN functionality split supporting M-MIMO in accordance with aspects of the present disclosure.

FIG. 11 illustrates an example of an advanced C-RAN functionality split supporting M-MIMO 1100 that supports methods and apparatus for flexible configuration of fronthaul split radio units in accordance with aspects of the present disclosure. In some examples, advanced c-RAN functionality split supporting M-MIMO 1100 may implement aspects of wireless communication system 100. In this example, a CU 1105 may be coupled with a 5GC 130-*g* and a DU 240-*g*. The DU 240-*g* may be coupled with one or more RUs 215-1, in a C-RAN deployment that may provide M-MIMO capability in communications with UEs.

In such a deployment, the DU 240-*g* may receive PDCP PDUs 1120 from the CU 1105, and perform RLC, MAC, and baseband functions. The DU 240-*g* may provide I/Q samples 1140 to the RU 215-1. The RU 215-1 may perform precoding baseband functions and RF functions. In this example, the RU 215-1 may include multiple baseband digital front ends 1130 and multiple RF front ends 1135 and may support M-MIMO. In this example, DU 240-*g* may include a NPU 1110 for performing RLC and MAC processing, and a baseband processor 1115.

In this example, RUs 215-1 may include a precoder processor 1125 that may provide precoding/combining processing capabilities for M-MIMO via the multiple baseband digital front ends 1130 and RF front ends 1135. In this example, DU 240-*g* may host baseband processing on a Linux server (e.g., as a PCIe card) or on an custom embedded printed circuit board with an NPU. The CU 1105 in such examples may host RRC, and PDCP functions (e.g., based on a Linux server). In some cases, such a deployment may provide M-MIMO capabilities for a number of different antenna ports.

Figure 12:
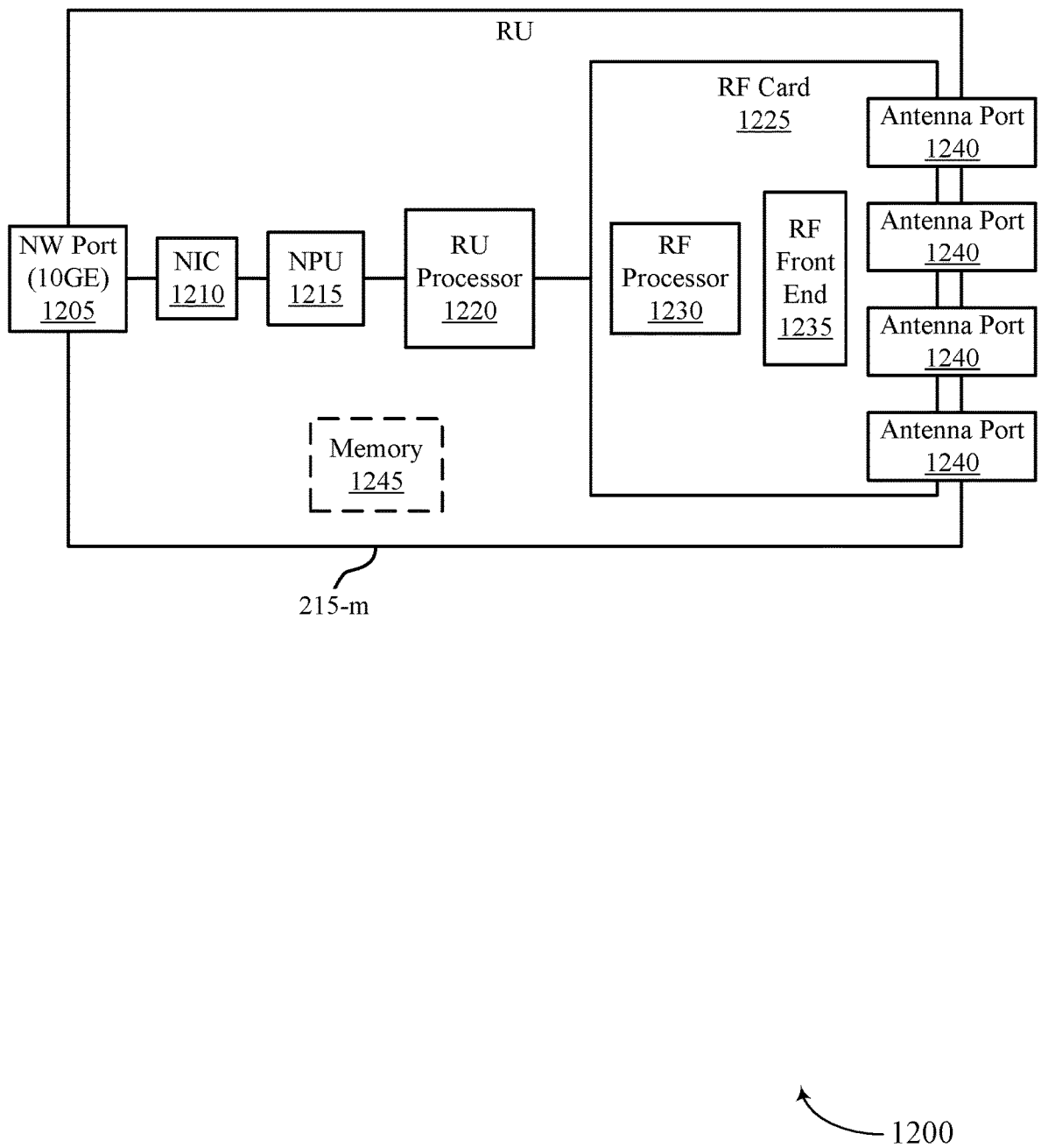
FIGS. 12 through 14 illustrate examples of RU hardware that supports methods and apparatus for flexible configuration of fronthaul split radio units in accordance with aspects of the present disclosure.

FIG. 12 illustrates an example of a RU hardware 1200 implementation that supports methods and apparatus for flexible configuration of fronthaul split radio units in accordance with aspects of the present disclosure. In some examples, RU hardware 1200 may implement aspects of wireless communication system 100. In this example, a RU 215-*m* may configurable for performing various different baseband and RF functions for a 2×2 small cell or in a CoMP deployment.

In this example, the RU 215-*m* may include a network port 1205 (e.g., a 10 GB Ethernet port), a network interface controller (NIC) 1210, a NPU 1215, a RU processor 1220, and an RF card 1225. The RF card 1225 may include, in this example, an RF processor 1230 (e.g., a Qualcomm Snapdragon-based RF processor) an RF front end 1235 (e.g., including transmit/receive chains with ADC, amplification components, analog phase-shift components, etc.), and antenna ports 1240. In this example, four antenna ports 1240 are present. As discussed herein, RU 215-*m* may be configured to perform different functions based on a desired deployment and other components (e.g., CU/DU components) that may be coupled with the RU 215-*m*. In some cases, memory 1245 may include configuration information that may be used to configure functionality of the RU 215-*m*. In other cases, the RU processor 1220, NPU 1215, or combinations thereof, may include memory that may be used to store configuration information. In some cases, the configuration information may be programmable such that the RU 215-*m* may be reconfigurable to perform different functions at different times. In some cases, the configuration information may include runtime configuration information that is used to configure the RU 215-*m*, or may include a boot image that is used at power-on or reset of the RU 215-*m*. In some cases, RU 215-*m* may be used on small cell deployments (e.g., supporting two transmit and four receive channels), or in deployments that implement CoMP (e.g., supporting two transmit and two receive channels).

Figure 13:
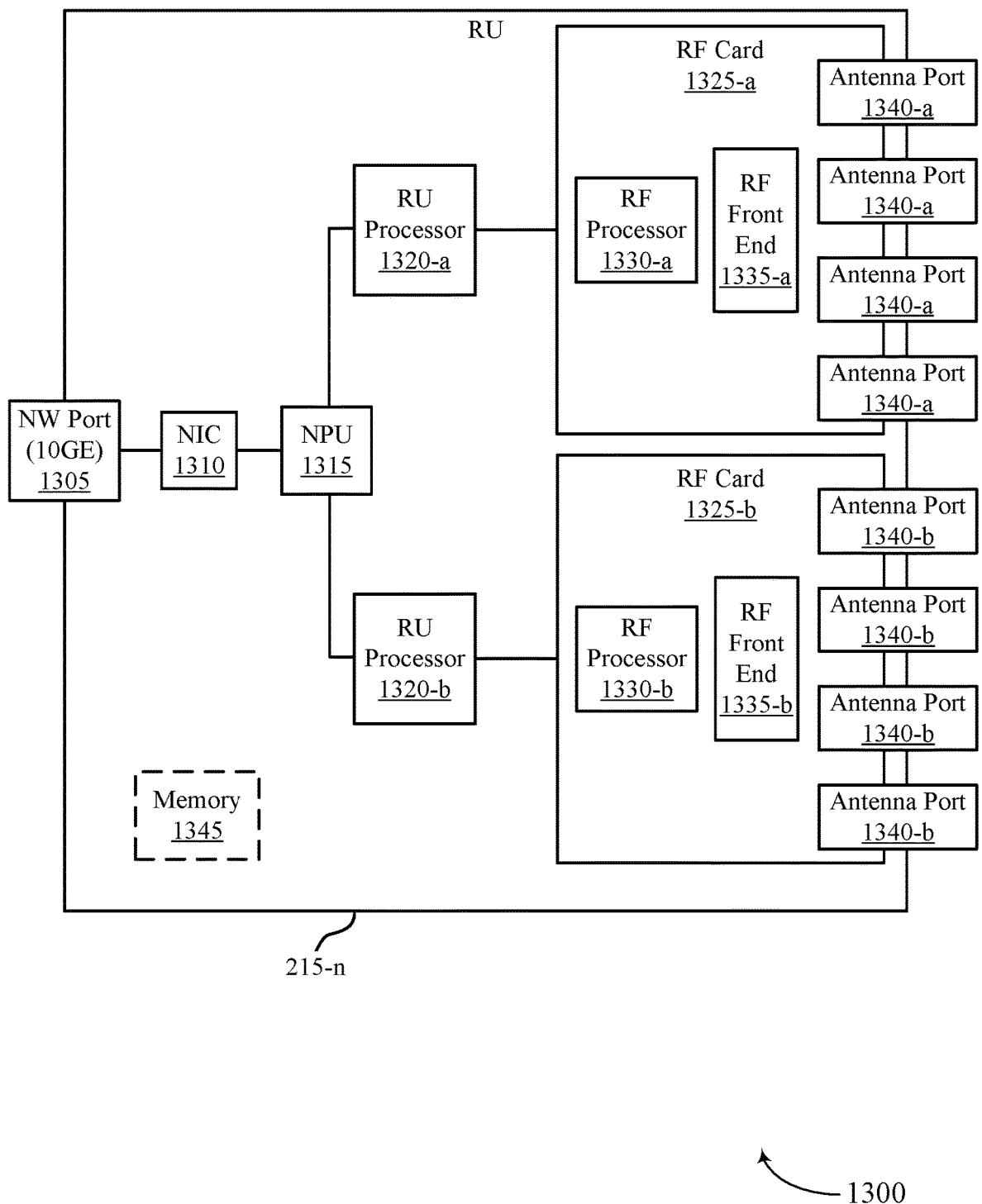

FIG. 13 illustrates an example of a RU hardware 1300 that supports methods and apparatus for flexible configuration of fronthaul split radio units in accordance with aspects of the present disclosure. In some examples, RU hardware 1300 may implement aspects of wireless communication system 100. In this example, a RU 215-*n* may configurable for performing various different baseband and RF functions for a 4×4 small cell or in a CoMP deployment.

In this example, the RU 215-*n* may include a network port 1305 (e.g., a 10 GB Ethernet port), a network interface controller (NIC) 1310, a NPU 1315, and multiple RU processors 1320 that are each associated with an RF card 1325. The RF cards 1325 may include, in this example, an RF processor 1330, an RF front end 1335 (e.g., including transmit/receive chains with ADC, amplification components, analog phase-shift components, etc.), and antenna ports 1340. In this example, four antenna ports 1340 are present at each RF card 1325. As discussed herein, RU 215-n may be configured to perform different functions based on a desired deployment and other components (e.g., CU/DU components) that may be coupled with the RU 215-n. In some cases, memory 1345 may include configuration information that may be used to configure functionality of the RU 215-n. In other cases, the RU processors 1320, NPU 1315, or combinations thereof, may include memory that may be used to store configuration information. In some cases, the configuration information may be programmable such that the RU 215-n may be reconfigurable to perform different functions at different times. In some cases, the configuration information may include runtime configuration information that is used to configure the RU 215-n, or may include a boot image that is used at power-on or reset of the RU 215-n. In some cases, RU 215-n may be used on small cell deployments (e.g., supporting four transmit and four receive channels), or in deployments that implement CoMP (e.g., supporting four transmit and four receive channels).

Figure 14:
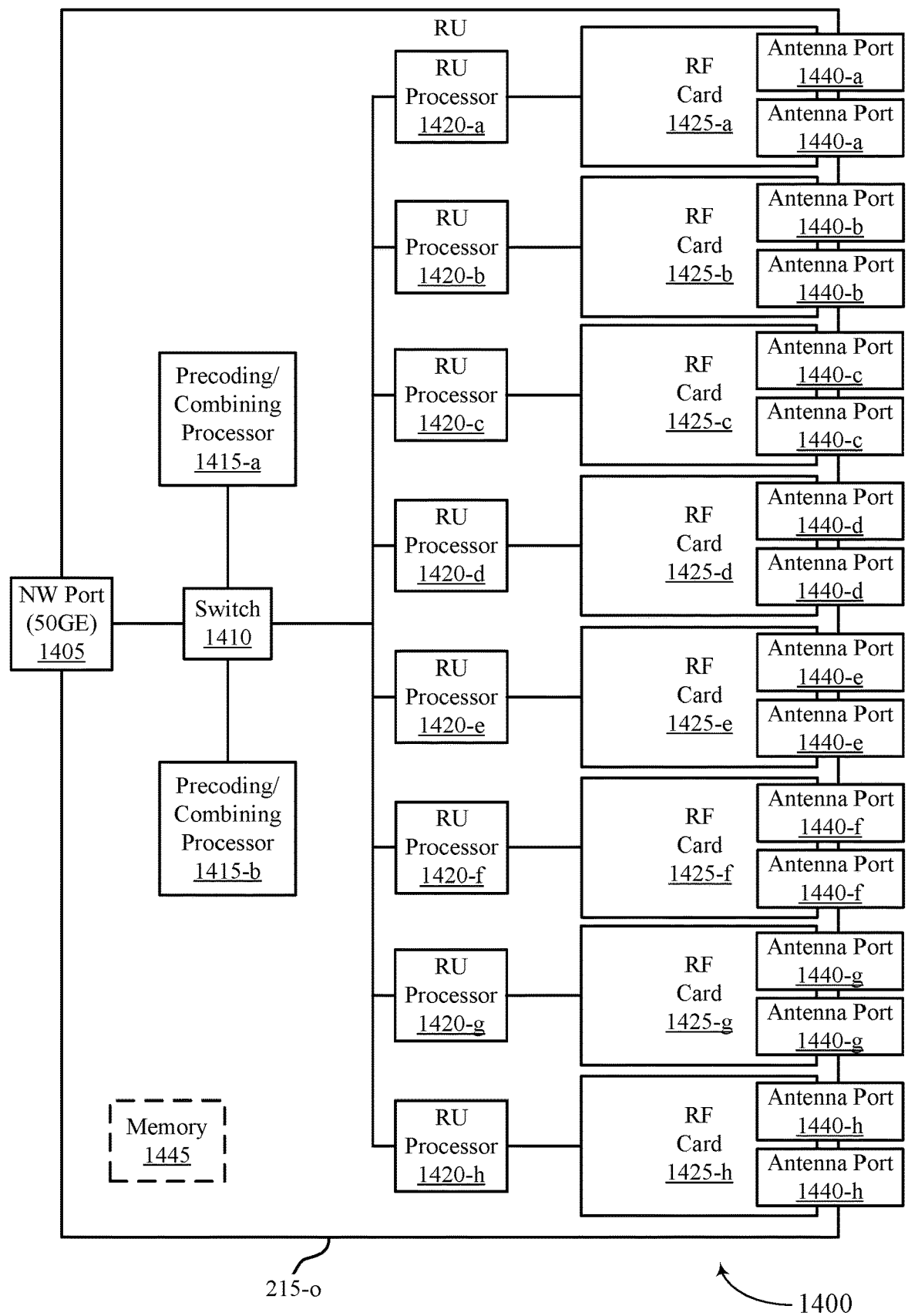

FIG. 14 illustrates an example of a RU hardware 1400 that supports methods and apparatus for flexible configuration of fronthaul split radio units in accordance with aspects of the present disclosure. In some examples, RU hardware 1400 may implement aspects of wireless communication system 100. In this example, a RU 215-o may configurable for performing various different baseband and RF functions for a 16×16 M-MIMO deployment.

In this example, the RU 215-o may include a network port 1405 (e.g., a 50 GB Ethernet port), a switch 1410 (e.g., a PCIe switch), multiple precoding/combining processors 1415, and multiple RU processors 1420 that are each associated with an RF card 1425. The RF cards 1425 may include, in this example, an RF processor, an RF front end, and antenna ports 1440. In this example, two antenna ports 1440 are present at each RF card 1425. As discussed herein, RU 215-o may be configured to perform different functions based on a desired deployment and other components (e.g., CU/DU components) that may be coupled with the RU 215-o. In some cases, memory 1445 may include configuration information that may be used to configure functionality of the RU 215-o. In other cases, the RU processors 1420, precoding/combining processors 1415, or combinations thereof, may include memory that may be used to store configuration information. In some cases, the configuration information may be programmable such that the RU 215-o may be reconfigurable to perform different functions at different times. In some cases, the configuration information may include runtime configuration information that is used to configure the RU 215-o, or may include a boot image that is used at power-on or reset of the RU 215-o. In some cases, RU 215-o may be used in M-MIMO deployments, 16 Tx/Tx channels, and 8 layers. The RU 215-o may also be used in other deployments and configured to perform functions based on the particular deployment.

Figure 15:
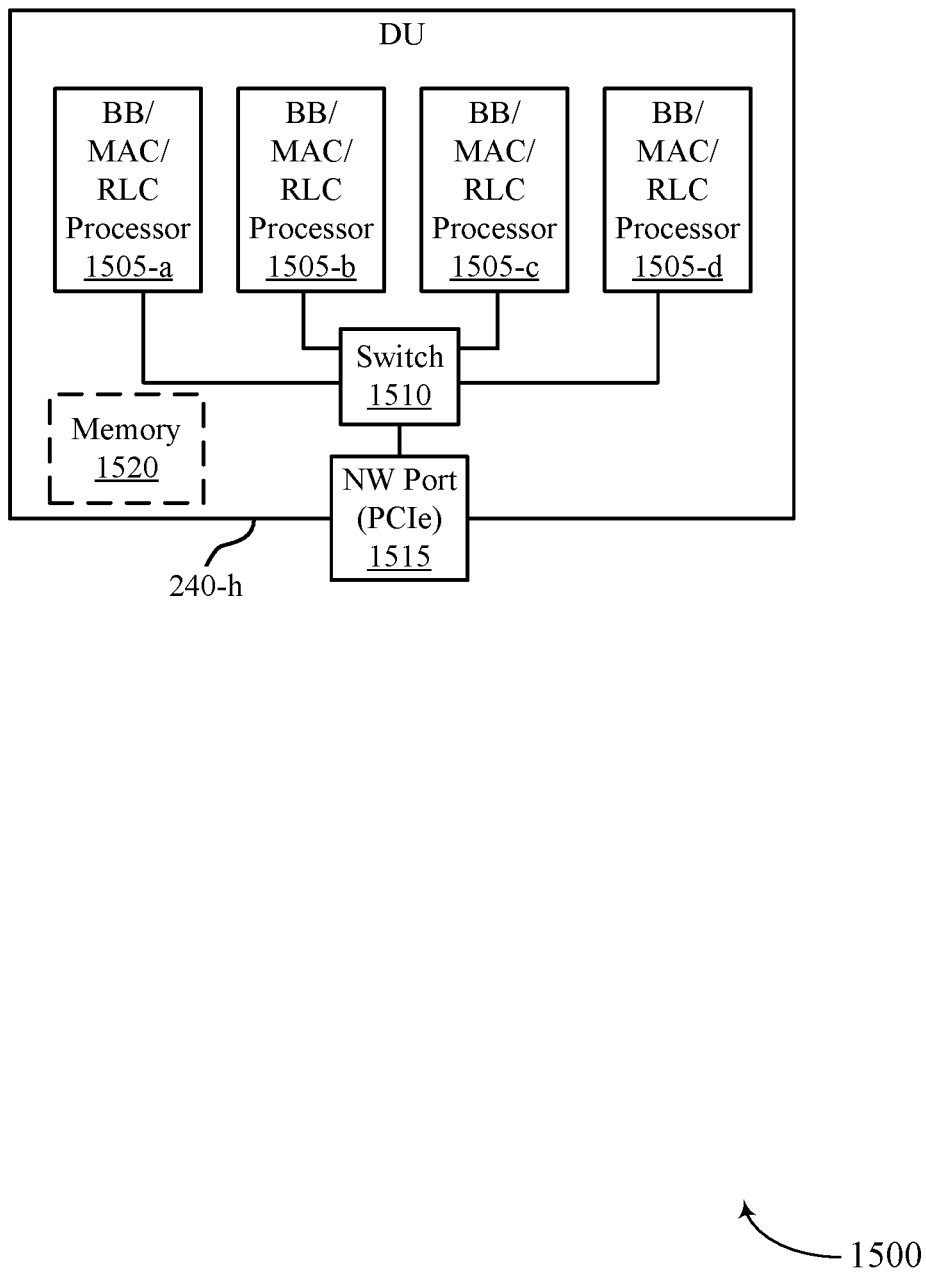
FIG. 15 illustrates an example of DU hardware that supports methods and apparatus for flexible configuration of fronthaul split radio units in accordance with aspects of the present disclosure.

FIG. 15 illustrates an example of a DU hardware 1500 that supports methods and apparatus for flexible configuration of fronthaul split radio units in accordance with aspects of the present disclosure. In some examples, DU hardware 1500 may implement aspects of wireless communication system 100.

In this example, DU 240-h may include a number of BB/MAC/RLC processors 1505 that are coupled with a switch 1510 (e.g., a PCI-e switch) and a network port 1515 (e.g., a PCIe port). In some cases, the DU 240-h may be implemented in a PCI card, and multiple DUs 240-h may be deployed in a system. In some cases, each BB/MAC/RLC processor 1505 may provide processing capabilities for baseband functions, MAC/RLC functions, or any combinations thereof. In some cases, memory 1520 may include configuration information that may be used to configure functionality of the DU 240-h. In other cases, the BB/MAC/RLC processors 1505 may include memory that may be used to store configuration information. In some cases, the configuration information may be programmable such that the DU 240-h may be reconfigurable to perform different functions at different times. In some cases, the configuration information may include runtime configuration information that is used to configure the DU 240-h, or may include a boot image that is used at power-on or reset of the DU 240-h.

Figure 16:
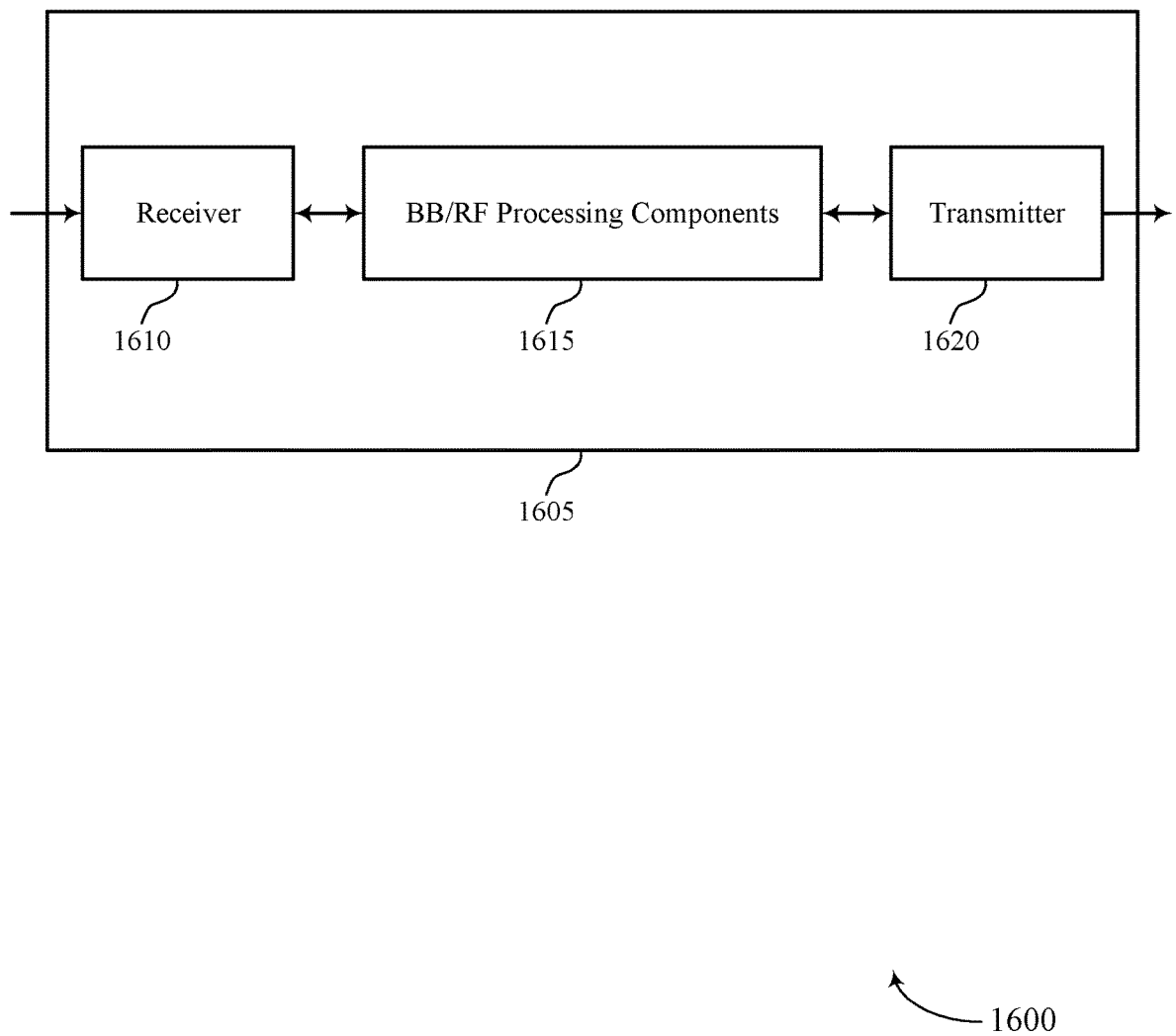
FIGS. 16 and 17 show block diagrams of devices that support methods and apparatus for flexible configuration of fronthaul split radio units in accordance with aspects of the present disclosure.

FIG. 16 shows a block diagram 1600 of a device 1605 that supports methods and apparatus for flexible configuration of fronthaul split radio units in accordance with aspects of the present disclosure. The device 1605 may be an example of aspects of a base station 105 or RU 215 as described herein. The device 1605 may include a receiver 1610, BB/RF processing components 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to methods and apparatus for flexible configuration of fronthaul split radio units, etc.). Information may be passed on to other components of the device 1605. The receiver 1610 may be an example of aspects of the transceiver 1920 described with reference to FIG. 19. The receiver 1610 may utilize a single antenna or a set of antennas.

In some cases, the BB/RF processing components 1615 may be examples of NPUs, RU processors, and RF components of a RU, as discussed herein. BB/RF processing components 1615 may identify configuration information that includes a first set of functions to be performed at the radio unit, where the radio unit has a capability to perform radio frequency functions, baseband functions, medium access control functions, or any combinations thereof, and the first set of functions includes at least one radio frequency function, configure the first set of functions at the radio unit based on the identifying, where the first set of functions includes a first set of downlink functions and a first set of uplink functions, receive, from a central unit or a distributed unit that performs a second set of functions, downlink signals that are to be processed according to the first set of downlink functions, process the downlink signals according to the first set of downlink functions to generate a downlink communication, and transmit the downlink communication to at least one UE.

In some cases, the BB/RF processing components 1615 may be examples of NPUs, DU processors, or other components of a DU, as discussed herein. The BB/RF processing components 1615 in such cases may identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configure the second set of functions at the distributed unit based on the identifying, where the second set of functions includes a second set of downlink functions and a second set of uplink functions, receive, from a central unit, downlink data that is to be processed according to the second set of downlink functions, process the downlink data according to the second set of downlink functions to generate downlink signals for processing and transmission by the radio unit, and communicate the downlink signals to the radio unit for processing according to the first set of functions and transmission to the UE. The BB/RF processing components 1615 may be an example of aspects of the BB/RF processing components 1910 described herein.

The BB/RF processing components 1615, or sub-components, may be implemented in hardware, code (e.g., software or firmware) executed by a processor, or any combination thereof. If implemented in code executed by a processor, the functions of the BB/RF processing components 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The BB/RF processing components 1615, or sub-components, may be physically located at various positions, including being distributed such that portions of functions are implemented at different physical locations by one or more physical components. In some examples, the BB/RF processing components 1615, or sub-components, may be a separate and distinct component in accordance with various aspects of the present disclosure. In some examples, the BB/RF processing components 1615, or sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
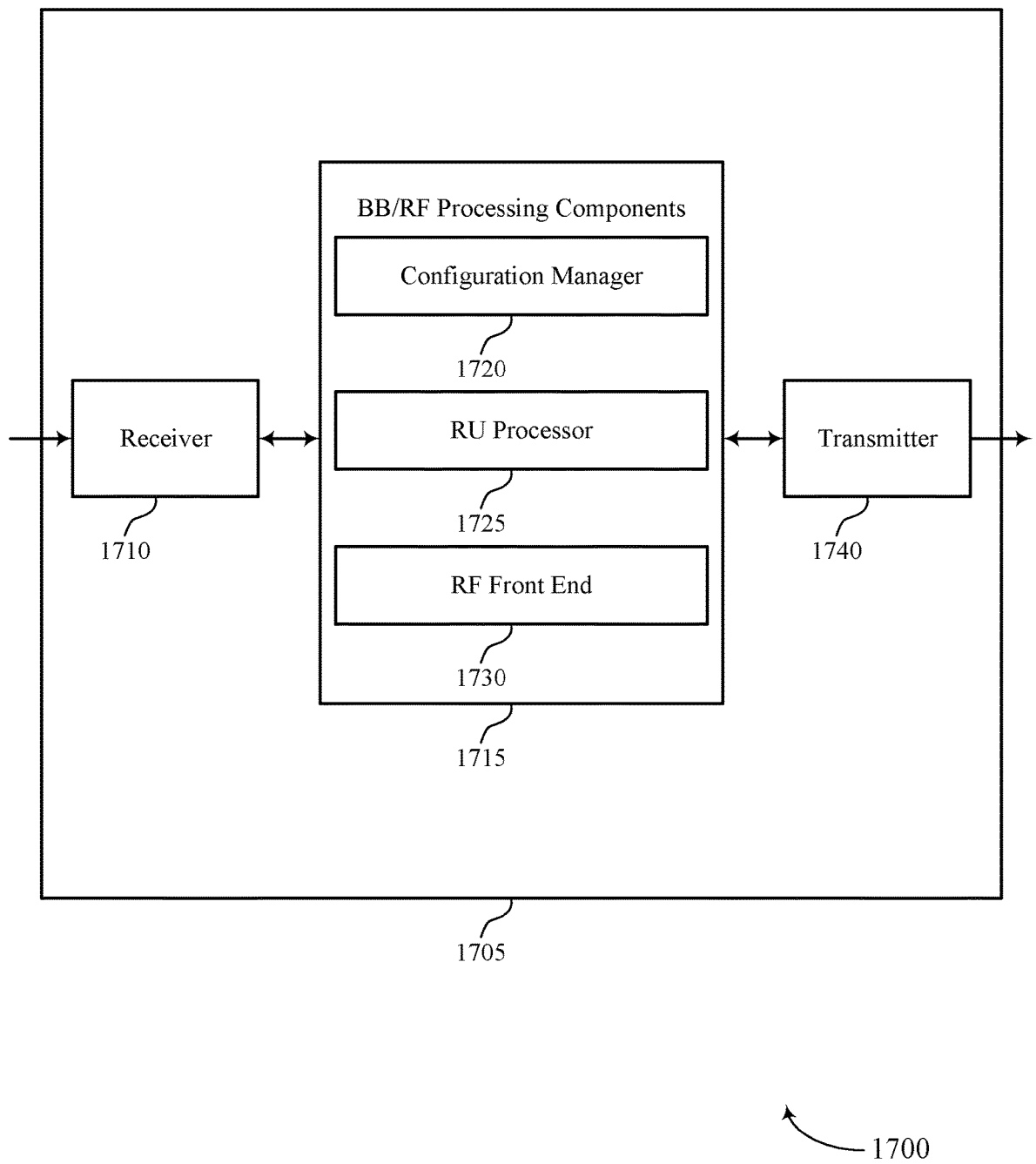

FIG. 17 shows a block diagram 1700 of a device 1705 that supports methods and apparatus for flexible configuration of fronthaul split radio units in accordance with aspects of the present disclosure. The device 1705 may be an example of aspects of a device 1605, or a base station 105 as described herein. The device 1705 may include a receiver 1710, BB/RF processing components 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to methods and apparatus for flexible configuration of fronthaul split radio units, etc.). Information may be passed on to other components of the device 1705. The receiver 1710 may be an example of aspects of the transceiver 1920 described with reference to FIG. 19. The receiver 1710 may utilize a single antenna or a set of antennas.

The BB/RF processing components 1715 may be an example of aspects of the BB/RF processing components 1615 as described herein. The BB/RF processing components 1715 may include a configuration manager 1720, a RU processor 1725, an RF front end 1730. The BB/RF processing components 1715 may be an example of aspects of the BB/RF processing components 1910 described herein.

The configuration manager 1720 may identify configuration information that includes a first set of functions to be performed at the radio unit, where the radio unit has a capability to perform radio frequency functions, baseband functions, medium access control functions, or any combinations thereof, and the first set of functions includes at least one radio frequency function and configure the first set of functions at the radio unit based on the identifying, where the first set of functions includes a first set of downlink functions and a first set of uplink functions.

The RU processor 1725 may receive, from a central unit or a distributed unit that performs a second set of functions, downlink signals that are to be processed according to the first set of downlink functions and process the downlink signals according to the first set of downlink functions to generate a downlink communication.

The RF front end 1730 may transmit the downlink communication to at least one UE.

The transmitter 1740 may transmit signals generated by other components of the device 1705. In some examples, the transmitter 1740 may be collocated with a receiver 1710 in a transceiver module. For example, the transmitter 1740 may be an example of aspects of the transceiver 1920 described with reference to FIG. 19. The transmitter 1740 may utilize a single antenna or a set of antennas.

Figure 18:
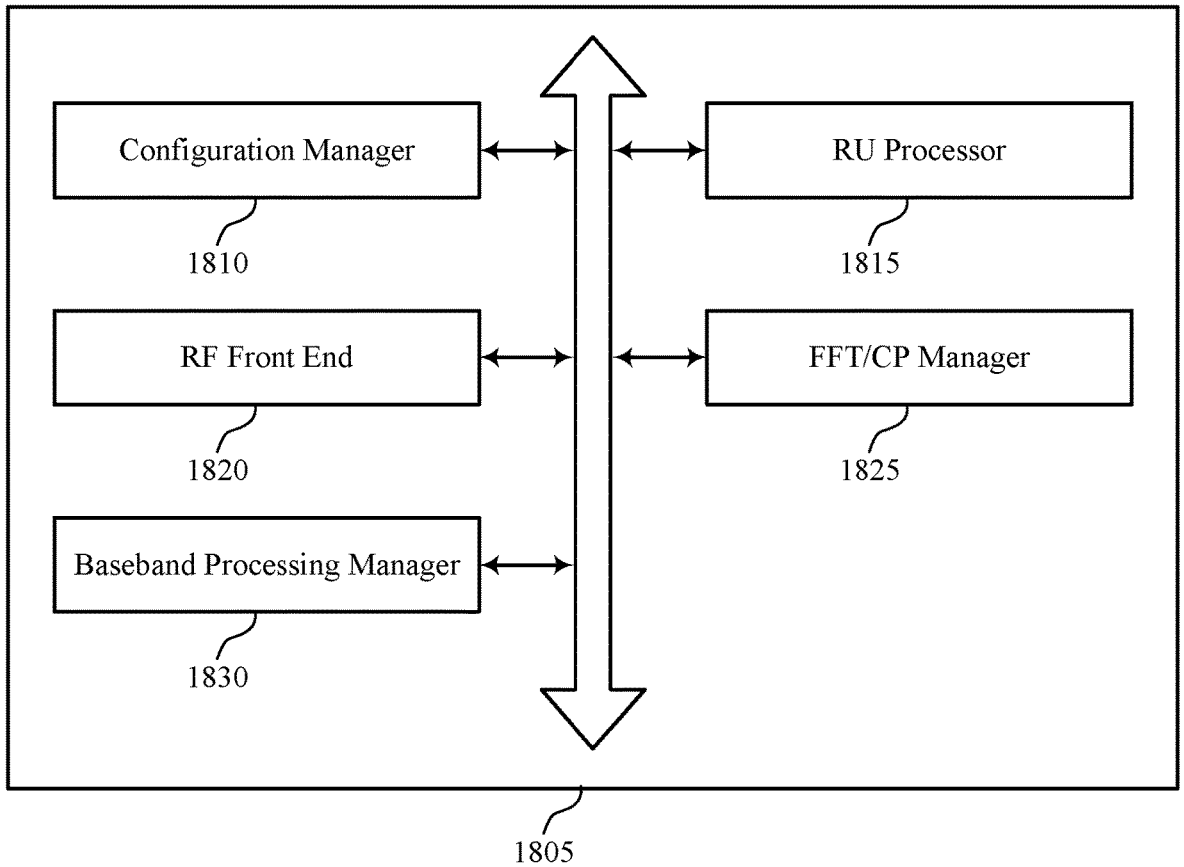
FIG. 18 shows a block diagram of BB/RF processing components that support methods and apparatus for flexible configuration of fronthaul split radio units in accordance with aspects of the present disclosure.

FIG. 18 shows a block diagram 1800 of BB/RF processing components 1805 that supports methods and apparatus for flexible configuration of fronthaul split radio units in accordance with aspects of the present disclosure. The BB/RF processing components 1805 may be an example of aspects of BB/RF processing components 1615, BB/RF processing components 1715, or BB/RF processing components 1910 described herein. The BB/RF processing components 1805 may include a configuration manager 1810, a RU processor 1815, an RF front end 1820, a FFT/CP manager 1825, and a baseband processing manager 1830. Each of these modules may communicate, directly or indirectly, with one another (e.g., via one or more buses).

The configuration manager 1810 may identify configuration information that includes a first set of functions to be performed at the radio unit, where the radio unit has a capability to perform radio frequency functions, baseband functions, medium access control functions, or any combinations thereof, and the first set of functions includes at least one radio frequency function. In some examples, the configuration manager 1810 may configure the first set of functions at the radio unit based on the identifying, where the first set of functions includes a first set of downlink functions and a first set of uplink functions.

In some examples, the configuration manager 1810 may receive updated configuration information that provides a reconfigured first set of functions that include more or fewer baseband functions that are to be performed at the radio unit. In some examples, the configuration manager 1810 may reconfigure the first set of functions at the radio unit based on the updated configuration information.

In some examples, a set of radio units support coordinated multipoint (CoMP) communications where same transport blocks are transmitted by the set of radio units to the UE with non-coherent precoding, and the set of radio units receive and independently decode uplink communications from the UE. In some examples, a set of radio units support coordinated multipoint (CoMP) communications with coherent or non-coherent precoding. In some examples, a set of radio units support massive multiple-input-multiple-output (M-MIMO) communications a set of UEs.

In some cases, the radio unit hosts baseband and radio frequency functions, and is collocated with the distributed unit that hosts medium access control and radio link control functions. In some cases, the radio unit hosts baseband and radio frequency functions, and medium access control and radio link control functions are split between the radio unit and the central unit. In some cases, the radio unit hosts radio frequency functions, the distributed unit hosts baseband functions, medium access control, and radio link control functions. In some cases, the radio unit hosts radio frequency functions and baseband functions including precoding and combining, and the distributed unit hosts medium access control and radio link control functions.

The RU processor 1815 may receive, from a central unit or a distributed unit that performs a second set of functions, downlink signals that are to be processed according to the first set of downlink functions. In some examples, the RU processor 1815 may process the downlink signals according to the first set of downlink functions to generate a downlink communication. In some examples, the RU processor 1815 may process the received radio frequency signals according to the first set of uplink functions to generate processed uplink signals. In some examples, the RU processor 1815 may provide the processed uplink signals to the central unit or the distributed unit to be processed according to the second set of functions. In some examples, the RU processor 1815 may communicate with the UE and the central unit or distributed unit using the reconfigured first set of functions.

In some cases, the first set of functions includes only the radio frequency functions and where the downlink signals and the processed uplink signals include digital I/Q samples. In some cases, the second set of functions are performed at the distributed unit and include the baseband functions and the medium access control functions. In some cases, the first set of functions includes the radio frequency functions and a first subset of baseband functions, and where the downlink signals and the processed uplink signals include digitally precoded tones.

In some cases, the first set of functions includes the radio frequency functions and a first subset of baseband functions, and where the downlink signals and the processed uplink signals include non-precoded tones. In some cases, the first set of functions includes the radio frequency functions and a first subset of baseband functions, and where the downlink signals and the processed uplink signals include digital information bits.

The RF front end 1820 may transmit the downlink communication to at least one UE. In some examples, the RF front end 1820 may receive radio frequency signals from the UE in a set of wireless resources associated with an uplink allocation granted to the UE for an uplink communication.

In some cases, the first set of downlink functions include a digital-to-analog conversion function and a transmit analog beamforming function, and the first set of uplink functions include a receive analog beamforming function and an analog-to-digital conversion function.

The FFT/CP manager 1825 may perform FFT and CP operations. In some cases, the first subset of baseband functions include Fourier transform processing and cyclic prefix addition for the downlink signals, and include cyclic prefix removal and Fourier transform processing for uplink signals. In some cases, the first subset of baseband functions include Fourier transform processing, cyclic prefix addition, resource mapping, and digital precoding for the downlink signals, and include cyclic prefix removal, Fourier transform processing, and resource demapping processing for uplink signals. In some cases, the first set of functions includes the radio frequency functions and a first subset of baseband functions, and where the downlink signals include encoded bits and the processed uplink signals include log likelihood ratio (LLR) metrics.

In some cases, the first subset of baseband functions include Fourier transform processing, cyclic prefix addition, resource mapping, digital precoding, layer mapping, and modulation for the downlink signals, and include cyclic prefix removal, Fourier transform processing, resource demapping processing, channel estimation and equalization, inverse discrete Fourier transform (IDFT) processing, and demodulation for uplink signals.

In some cases, the first subset of baseband functions include Fourier transform processing, cyclic prefix addition, resource mapping, digital precoding, layer mapping, modulation, scrambling, rate-matching, and coding for the downlink signals, and include cyclic prefix removal, Fourier transform processing, resource demapping processing, channel estimation and equalization, inverse discrete Fourier transform (IDFT) processing, demodulation, descrambling, de-rate-matching, and decoding for uplink signals.

In some cases, the uplink signals from the radio unit and the downlink signals to the radio unit include digital I/Q samples, and the second set of functions includes all baseband functions and medium access control functions.

In some cases, the downlink signals and the uplink signals include digitally precoded tones, and where the second set of functions include a subset of baseband functions and the medium access control functions, and where the radio unit performs one or more baseband functions that are not included in the subset of baseband functions.

Figure 19:
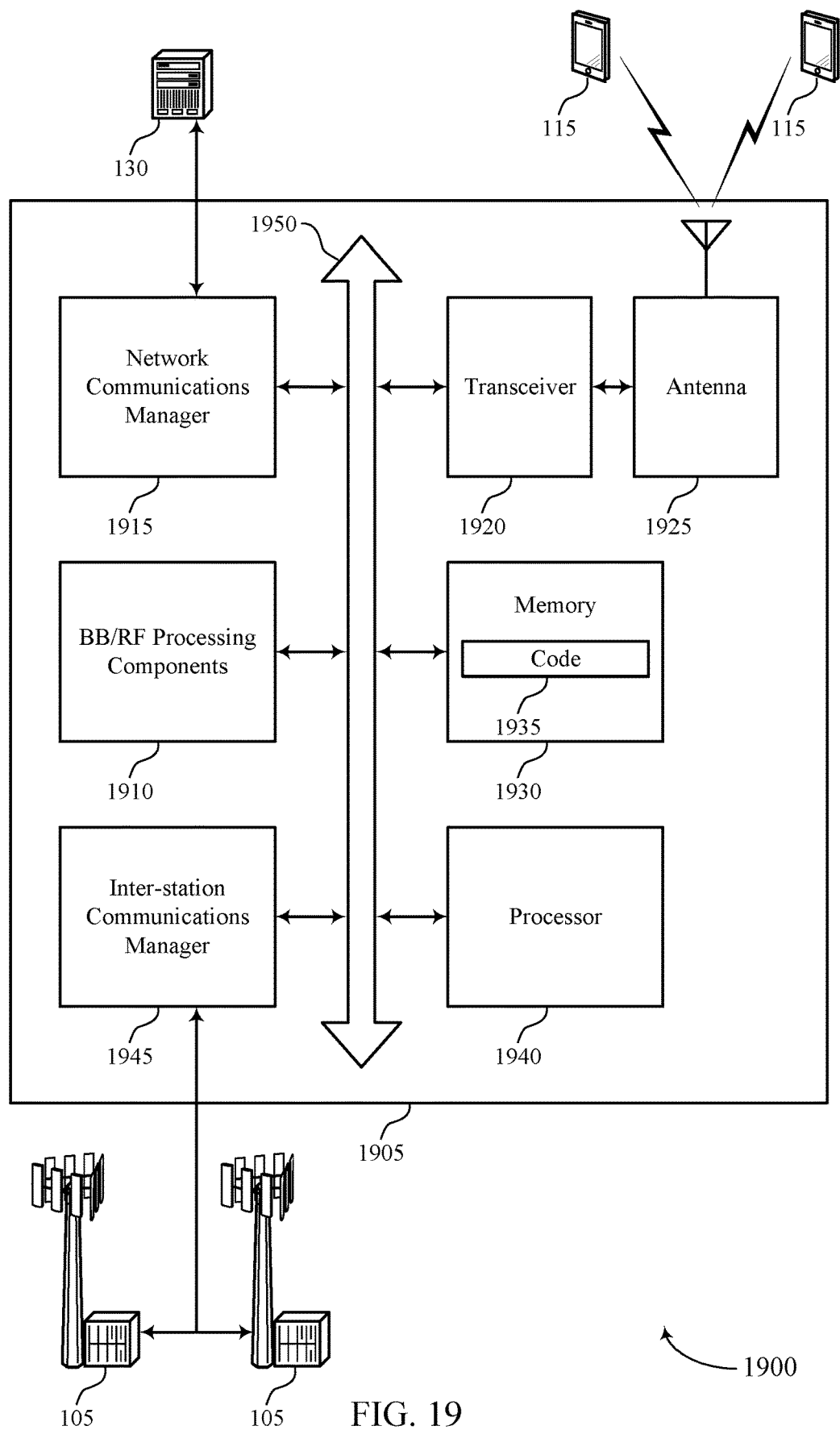
FIG. 19 shows a diagram of a system including a device that supports methods and apparatus for flexible configuration of fronthaul split radio units in accordance with aspects of the present disclosure.

FIG. 19 shows a diagram of a system 1900 including a device 1905 that supports methods and apparatus for flexible configuration of fronthaul split radio units in accordance with aspects of the present disclosure. The device 1905 may be an example of or include the components of device 1605, device 1705, or a base station 105 as described herein, and include a DU, RU, or both. The device 1905 may include components for bi-directional voice and data communications including components for transmitting and receiving communications, including a BB/RF processing components 1910, a network communications manager 1915, a transceiver 1920, an antenna 1925, memory 1930, a processor 1940, and an inter-station communications manager 1945. These components may be in electronic communication via one or more buses (e.g., bus 1950).

The BB/RF processing components 1910 when implemented in a RU may identify configuration information that includes a first set of functions to be performed at the radio unit, where the radio unit has a capability to perform radio frequency functions, baseband functions, medium access control functions, or any combinations thereof, and the first set of functions includes at least one radio frequency function, configure the first set of functions at the radio unit based on the identifying, where the first set of functions includes a first set of downlink functions and a first set of uplink functions, receive, from a central unit or a distributed unit that performs a second set of functions, downlink signals that are to be processed according to the first set of downlink functions, process the downlink signals according to the first set of downlink functions to generate a downlink communication, and transmit the downlink communication to at least one UE.

The BB/RF processing components 1910 when implemented in a DU may identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function, configure the second set of functions at the distributed unit based on the identifying, where the second set of functions includes a second set of downlink functions and a second set of uplink functions, receive, from a central unit, downlink data that is to be processed according to the second set of downlink functions, process the downlink data according to the second set of downlink functions to generate downlink signals for processing and transmission by the radio unit, and communicate the downlink signals to the radio unit for processing according to the first set of functions and transmission to the UE.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting methods and apparatus for flexible configuration of fronthaul split radio units).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
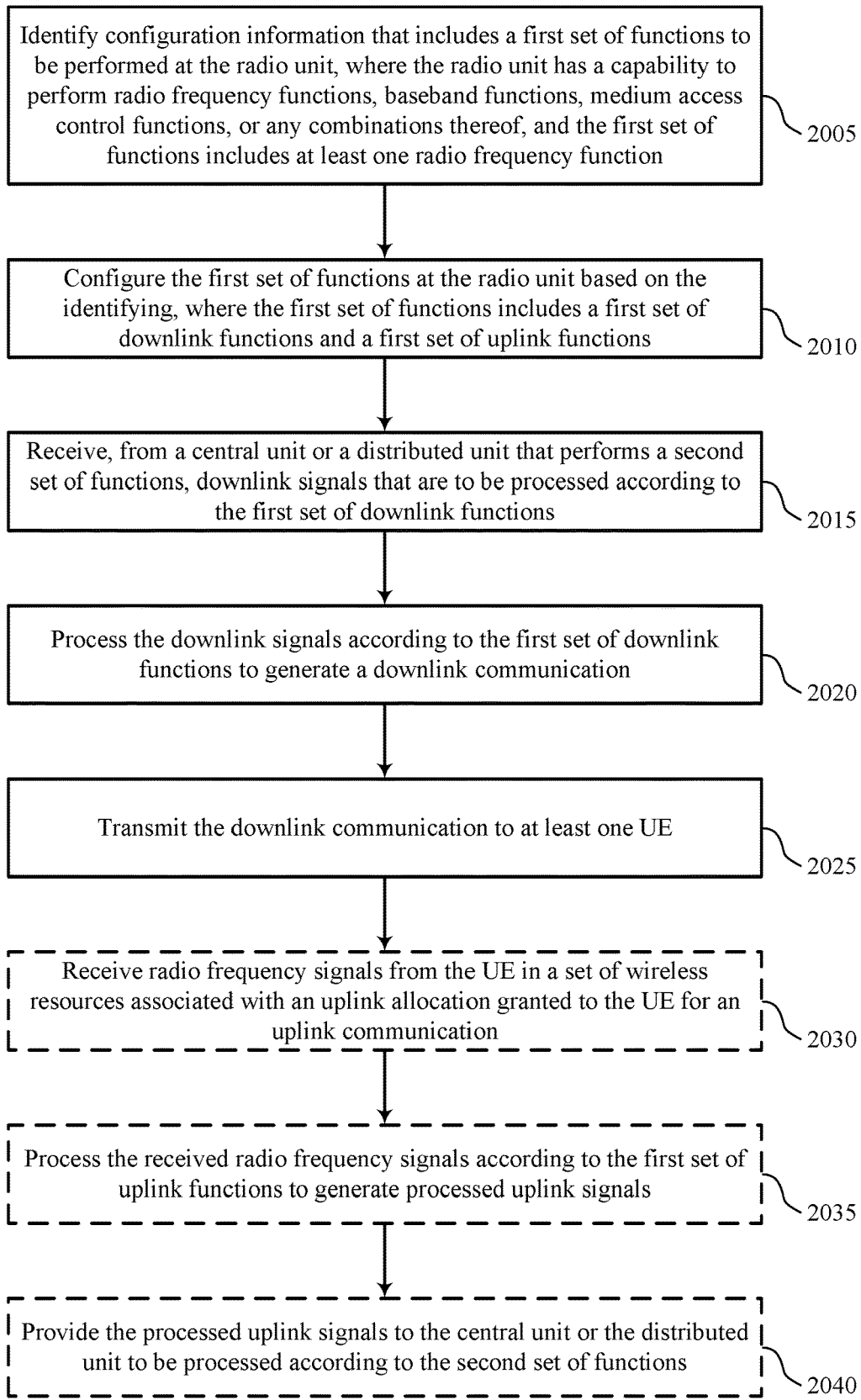
FIGS. 20 through 23 show flowcharts illustrating methods for flexible configuration of fronthaul split radio units in accordance with aspects of the present disclosure.

FIG. 20 shows a flowchart illustrating a method 2000 for flexible configuration of fronthaul split radio units in accordance with aspects of the present disclosure. The operations of method 2000 may be implemented by a base station 105 or its components as described herein. For example, the operations of method 2000 may be performed by a BB/RF processing components as described with reference to FIGS. 16 through 19. In some examples, a base station or RU may execute a set of instructions to control the functional elements of the base station to perform the functions described below. Additionally or alternatively, a base station may perform aspects of the functions described below using special-purpose hardware.

At 2005, the base station may identify configuration information that includes a first set of functions to be performed at the radio unit, where the radio unit has a capability to perform radio frequency functions, baseband functions, medium access control functions, or any combinations thereof, and the first set of functions includes at least one radio frequency function. The operations of 2005 may be performed according to the methods described herein. In some examples, aspects of the operations of 2005 may be performed by a configuration manager as described with reference to FIGS. 16 through 19.

At 2010, the base station may configure the first set of functions at the radio unit based on the identifying, where the first set of functions includes a first set of downlink functions and a first set of uplink functions. The operations of 2010 may be performed according to the methods described herein. In some examples, aspects of the operations of 2010 may be performed by a configuration manager as described with reference to FIGS. 16 through 19.

At 2015, the base station may receive, from a central unit or a distributed unit that performs a second set of functions, downlink signals that are to be processed according to the first set of downlink functions. The operations of 2015 may be performed according to the methods described herein. In some examples, aspects of the operations of 2015 may be performed by a RU processor as described with reference to FIGS. 16 through 19.

At 2020, the base station may process the downlink signals according to the first set of downlink functions to generate a downlink communication. The operations of 2020 may be performed according to the methods described herein. In some examples, aspects of the operations of 2020 may be performed by a RU processor as described with reference to FIGS. 16 through 19.

At 2025, the base station may transmit the downlink communication to at least one UE. The operations of 2025 may be performed according to the methods described herein. In some examples, aspects of the operations of 2025 may be performed by an RF front end as described with reference to FIGS. 16 through 19.

At 2030, the base station may receive radio frequency signals from the UE in a set of wireless resources associated with an uplink allocation granted to the UE for an uplink communication. The operations of 2030 may be performed according to the methods described herein. In some examples, aspects of the operations of 2030 may be performed by an RF front end as described with reference to FIGS. 16 through 19.

At 2035, the base station may process the received radio frequency signals according to the first set of uplink functions to generate processed uplink signals. The operations of 2035 may be performed according to the methods described herein. In some examples, aspects of the operations of 2035 may be performed by a RU processor as described with reference to FIGS. 16 through 19.

At 2040, the base station may provide the processed uplink signals to the central unit or the distributed unit to be processed according to the second set of functions. The operations of 2040 may be performed according to the methods described herein. In some examples, aspects of the operations of 2040 may be performed by a RU processor as described with reference to FIGS. 16 through 19.

Figure 21:
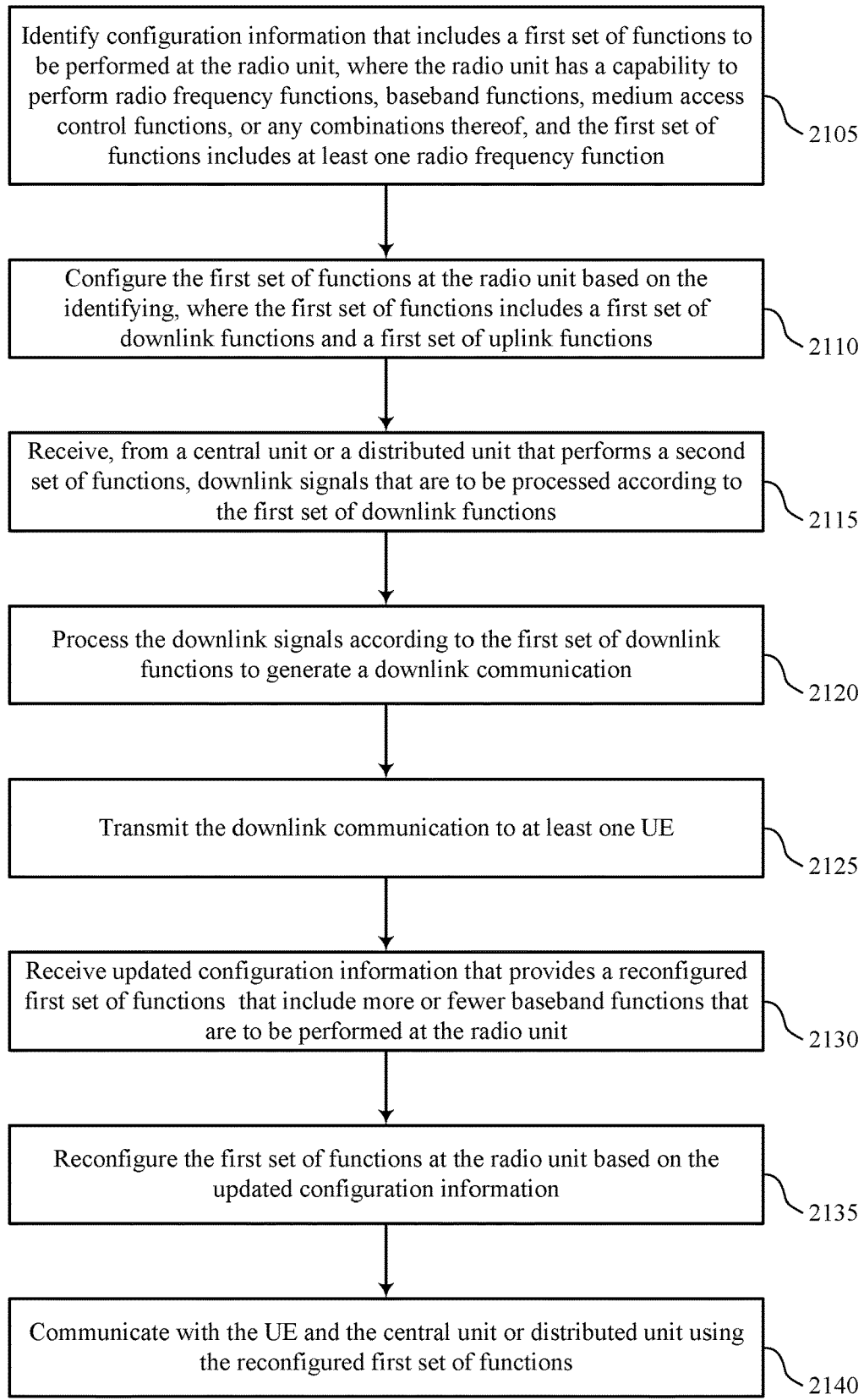

FIG. 21 shows a flowchart illustrating a method 2100 for flexible configuration of fronthaul split radio units in accordance with aspects of the present disclosure. The operations of method 2100 may be implemented by a base station 105 or RU or its components as described herein. For example, the operations of method 2100 may be performed by a BB/RF processing components as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2105, the base station may identify configuration information that includes a first set of functions to be performed at the radio unit, where the radio unit has a capability to perform radio frequency functions, baseband functions, medium access control functions, or any combinations thereof, and the first set of functions includes at least one radio frequency function. The operations of 2105 may be performed according to the methods described herein. In some examples, aspects of the operations of 2105 may be performed by a configuration manager as described with reference to FIGS. 16 through 19.

At 2110, the base station may configure the first set of functions at the radio unit based on the identifying, where the first set of functions includes a first set of downlink functions and a first set of uplink functions. The operations of 2110 may be performed according to the methods described herein. In some examples, aspects of the operations of 2110 may be performed by a configuration manager as described with reference to FIGS. 16 through 19.

At 2115, the base station may receive, from a central unit or a distributed unit that performs a second set of functions, downlink signals that are to be processed according to the first set of downlink functions. The operations of 2115 may be performed according to the methods described herein. In some examples, aspects of the operations of 2115 may be performed by a RU processor as described with reference to FIGS. 16 through 19.

At 2120, the base station may process the downlink signals according to the first set of downlink functions to generate a downlink communication. The operations of 2120 may be performed according to the methods described herein. In some examples, aspects of the operations of 2120 may be performed by a RU processor as described with reference to FIGS. 16 through 19.

At 2125, the base station may transmit the downlink communication to at least one UE. The operations of 2125 may be performed according to the methods described herein. In some examples, aspects of the operations of 2125 may be performed by an RF front end as described with reference to FIGS. 16 through 19.

At 2130, the base station may receive updated configuration information that provides a reconfigured first set of functions that include more or fewer baseband functions that are to be performed at the radio unit. The operations of 2130 may be performed according to the methods described herein. In some examples, aspects of the operations of 2130 may be performed by a configuration manager as described with reference to FIGS. 16 through 19.

At 2135, the base station may reconfigure the first set of functions at the radio unit based on the updated configuration information. The operations of 2135 may be performed according to the methods described herein. In some examples, aspects of the operations of 2135 may be performed by a configuration manager as described with reference to FIGS. 16 through 19.

At 2140, the base station may communicate with the UE and the central unit or distributed unit using the reconfigured first set of functions. The operations of 2140 may be performed according to the methods described herein. In some examples, aspects of the operations of 2140 may be performed by a RU processor as described with reference to FIGS. 16 through 19.

Figure 22:
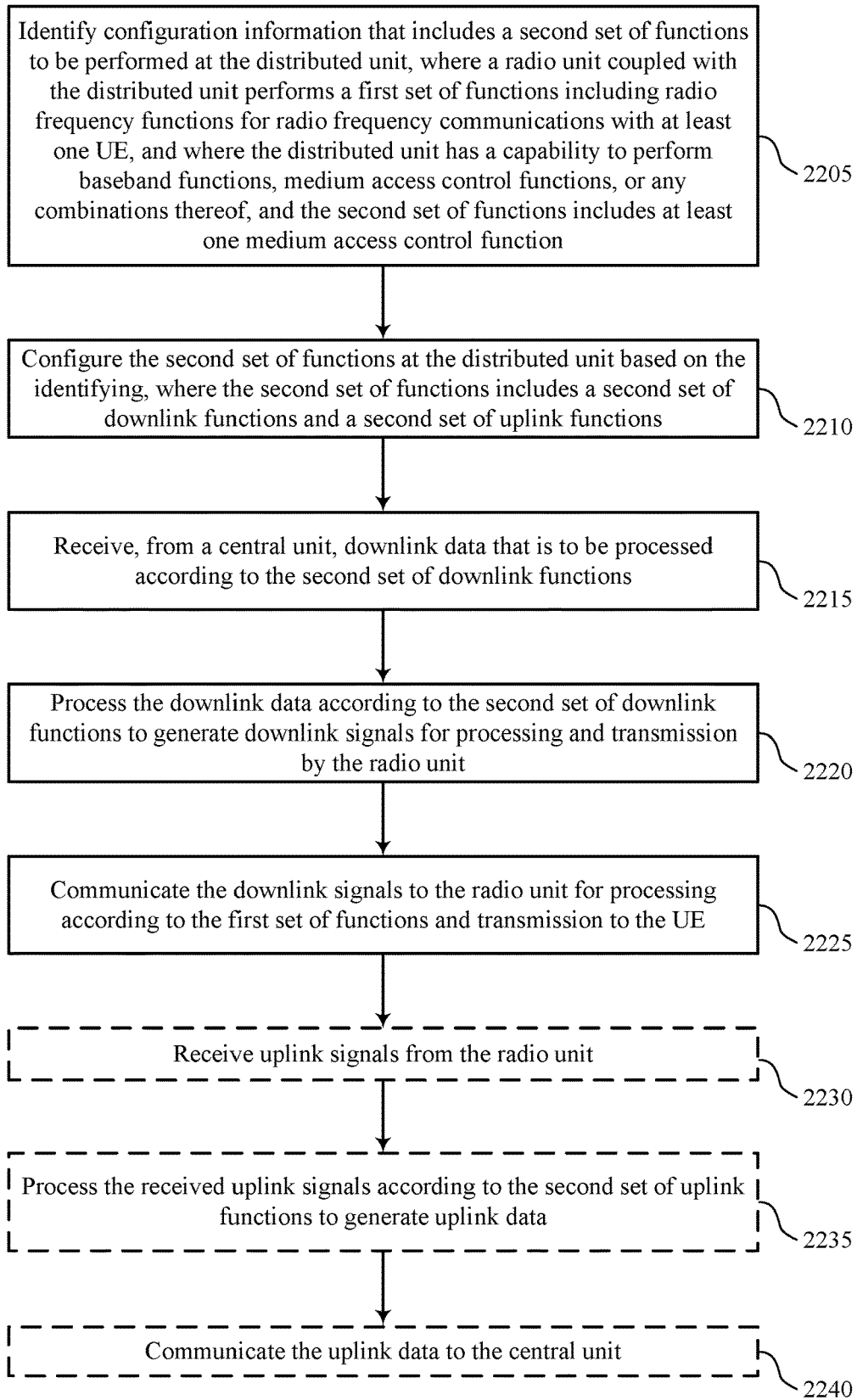

FIG. 22 shows a flowchart illustrating a method 2200 for flexible configuration of fronthaul split radio units in accordance with aspects of the present disclosure. The operations of method 2200 may be implemented by a base station 105 or DU or its components as described herein. For example, the operations of method 2200 may be performed by a BB/RF processing components as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2205, the base station may identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function. The operations of 2205 may be performed according to the methods described herein. In some examples, aspects of the operations of 2205 may be performed by a configuration manager as described with reference to FIGS. 16 through 19.

At 2210, the base station may configure the second set of functions at the distributed unit based on the identifying, where the second set of functions includes a second set of downlink functions and a second set of uplink functions. The operations of 2210 may be performed according to the methods described herein. In some examples, aspects of the operations of 2210 may be performed by a configuration manager as described with reference to FIGS. 16 through 19.

At 2215, the base station may receive, from a central unit, downlink data that is to be processed according to the second set of downlink functions. The operations of 2215 may be performed according to the methods described herein. In some examples, aspects of the operations of 2215 may be performed by a DU processor as described with reference to FIGS. 16 through 19.

At 2220, the base station may process the downlink data according to the second set of downlink functions to generate downlink signals for processing and transmission by the radio unit. The operations of 2220 may be performed according to the methods described herein. In some examples, aspects of the operations of 2220 may be performed by a DU processor as described with reference to FIGS. 16 through 19.

At 2225, the base station may communicate the downlink signals to the radio unit for processing according to the first set of functions and transmission to the UE. The operations of 2225 may be performed according to the methods described herein. In some examples, aspects of the operations of 2225 may be performed by a DU processor as described with reference to FIGS. 16 through 19.

At 2230, the base station may receive uplink signals from the radio unit. The operations of 2230 may be performed according to the methods described herein. In some examples, aspects of the operations of 2230 may be performed by a DU processor as described with reference to FIGS. 16 through 19.

At 2235, the base station may process the received uplink signals according to the second set of uplink functions to generate uplink data. The operations of 2235 may be performed according to the methods described herein. In some examples, aspects of the operations of 2235 may be performed by a DU processor as described with reference to FIGS. 16 through 19.

At 2240, the base station may communicate the uplink data to the central unit. The operations of 2240 may be performed according to the methods described herein. In some examples, aspects of the operations of 2240 may be performed by a DU processor as described with reference to FIGS. 16 through 19.

Figure 23:
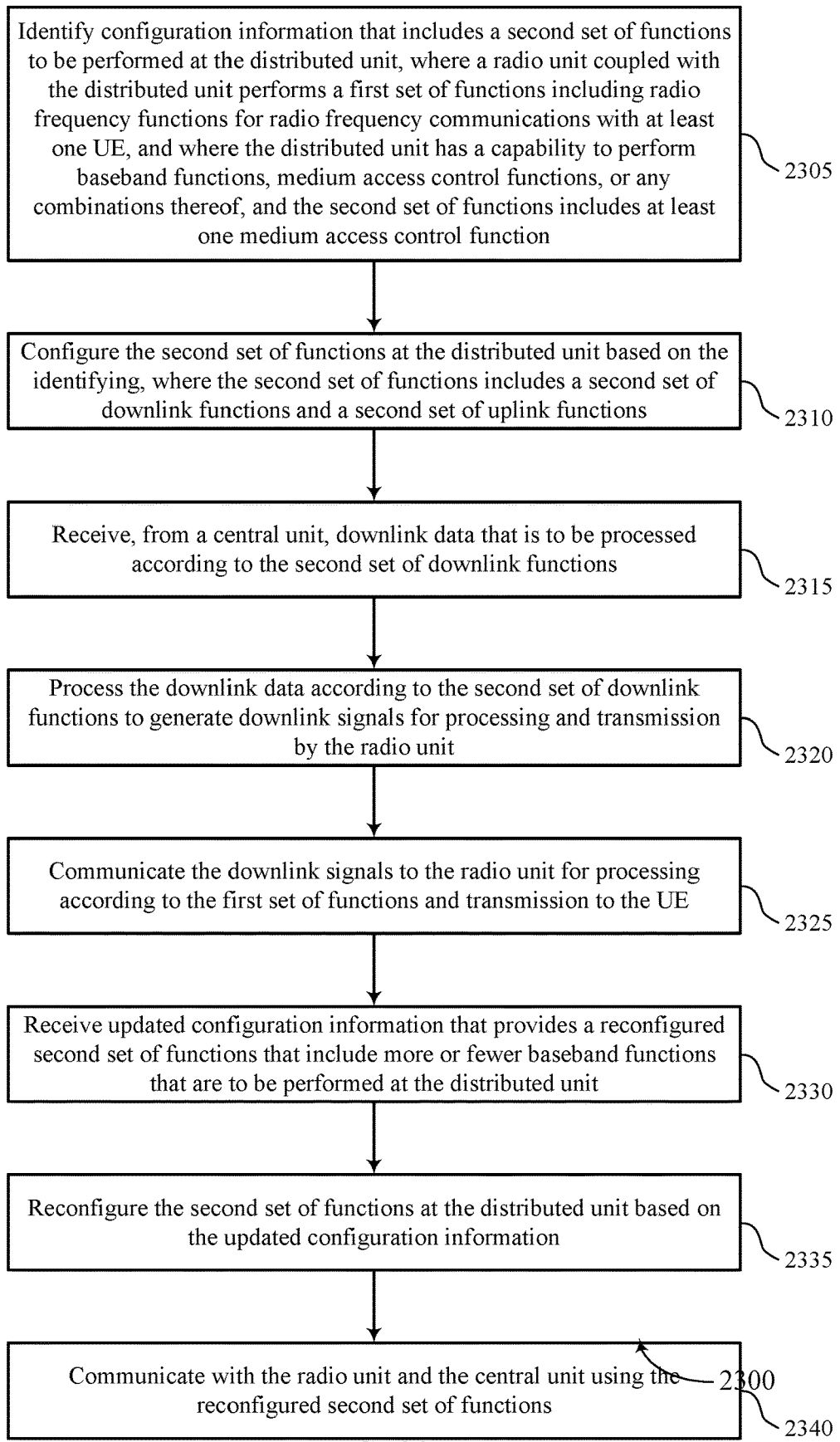

FIG. 23 shows a flowchart illustrating a method 2300 for flexible configuration of fronthaul split radio units in accordance with aspects of the present disclosure. The operations of method 2300 may be implemented by a base station 105 or DU or its components as described herein. For example, the operations of method 2300 may be performed by a BB/RF processing components as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2305, the base station may identify configuration information that includes a second set of functions to be performed at the distributed unit, where a radio unit coupled with the distributed unit performs a first set of functions including radio frequency functions for radio frequency communications with at least one UE, and where the distributed unit has a capability to perform baseband functions, medium access control functions, or any combinations thereof, and the second set of functions includes at least one medium access control function. The operations of 2305 may be performed according to the methods described herein. In some examples, aspects of the operations of 2305 may be performed by a configuration manager as described with reference to FIGS. 16 through 19.

At 2310, the base station may configure the second set of functions at the distributed unit based on the identifying, where the second set of functions includes a second set of downlink functions and a second set of uplink functions. The operations of 2310 may be performed according to the methods described herein. In some examples, aspects of the operations of 2310 may be performed by a configuration manager as described with reference to FIGS. 16 through 19.

At 2315, the base station may receive, from a central unit, downlink data that is to be processed according to the second set of downlink functions. The operations of 2315 may be performed according to the methods described herein. In some examples, aspects of the operations of 2315 may be performed by a DU processor as described with reference to FIGS. 16 through 19.

At 2320, the base station may process the downlink data according to the second set of downlink functions to generate downlink signals for processing and transmission by the radio unit. The operations of 2320 may be performed according to the methods described herein. In some examples, aspects of the operations of 2320 may be performed by a DU processor as described with reference to FIGS. 16 through 19.

At 2325, the base station may communicate the downlink signals to the radio unit for processing according to the first set of functions and transmission to the UE. The operations of 2325 may be performed according to the methods described herein. In some examples, aspects of the operations of 2325 may be performed by a DU processor as described with reference to FIGS. 16 through 19.

At 2330, the base station may receive updated configuration information that provides a reconfigured second set of functions that include more or fewer baseband functions that are to be performed at the distributed unit. The operations of 2330 may be performed according to the methods described herein. In some examples, aspects of the operations of 2330 may be performed by a configuration manager as described with reference to FIGS. 16 through 19.

At 2335, the base station may reconfigure the second set of functions at the distributed unit based on the updated configuration information. The operations of 2335 may be performed according to the methods described herein. In some examples, aspects of the operations of 2335 may be performed by a configuration manager as described with reference to FIGS. 16 through 19.

At 2340, the base station may communicate with the radio unit and the central unit using the reconfigured second set of functions. The operations of 2340 may be performed according to the methods described herein. In some examples, aspects of the operations of 2340 may be performed by a configuration manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a radio unit of a wireless communications system, comprising: identifying configuration information that includes a first set of functions to be performed at the radio unit, wherein the radio unit has a capability to perform radio frequency functions, baseband functions, medium access control functions, or any combinations thereof, and the first set of functions includes at least one radio frequency function; configuring the first set of functions at the radio unit based at least in part on the identifying, wherein the first set of functions includes a first set of downlink functions and a first set of uplink functions; receiving, from a central unit or a distributed unit that performs a second set of functions, downlink signals that are to be processed according to the first set of downlink functions; processing the downlink signals according to the first set of downlink functions to generate a downlink communication; and transmitting the downlink communication to at least one UE.

Aspect 2: The method of aspect 1, further comprising: receiving radio frequency signals from the UE in a set of wireless resources associated with an uplink allocation granted to the UE for an uplink communication; processing the received radio frequency signals according to the first set of uplink functions to generate processed uplink signals; and providing the processed uplink signals to the central unit or the distributed unit to be processed according to the second set of functions.

Aspect 3: The method of aspect 2, wherein the first set of functions includes only the radio frequency functions and the downlink signals and the processed uplink signals include digital I/Q samples.

Aspect 4: The method of aspect 3, wherein the second set of functions are performed at the distributed unit and include the baseband functions and the medium access control functions.

Aspect 5: The method of any of aspects 3 through 4, wherein the first set of downlink functions include a digital-to-analog conversion function and a transmit analog beamforming function, and the first set of uplink functions include a receive analog beamforming function and an analog-to-digital conversion function.

Aspect 6: The method of aspect 2, wherein the first set of functions includes the radio frequency functions and a first subset of baseband functions, and the downlink signals and the processed uplink signals include digitally precoded tones.

Aspect 7: The method of aspect 6, wherein the second set of functions are performed at the distributed unit and include a second subset of baseband functions and the medium access control functions.

Aspect 8: The method of any of aspects 6 through 7, wherein the first subset of baseband functions include Fourier transform processing and cyclic prefix addition for the downlink signals, and include cyclic prefix removal and Fourier transform processing for uplink signals.

Aspect 9: The method of aspect 2, wherein the first set of functions includes the radio frequency functions and a first subset of baseband functions, and the downlink signals and the processed uplink signals include non-precoded tones.

Aspect 10: The method of aspect 9, wherein the first subset of baseband functions include Fourier transform processing, cyclic prefix addition, resource mapping, and digital precoding for the downlink signals, and include cyclic prefix removal, Fourier transform processing, and resource demapping processing for uplink signals.

Aspect 11: The method of aspect 2, wherein the first set of functions includes the radio frequency functions and a first subset of baseband functions, and the downlink signals include encoded bits and the processed uplink signals include log likelihood ratio (LLR) metrics.

Aspect 12: The method of aspect 11, wherein the first subset of baseband functions include Fourier transform processing, cyclic prefix addition, resource mapping, digital precoding, layer mapping, and modulation for the downlink signals, and include cyclic prefix removal, Fourier transform processing, resource demapping processing, channel estimation and equalization, inverse discrete Fourier transform (IDFT) processing, and demodulation for uplink signals.

Aspect 13: The method of aspect 2, wherein the first set of functions includes the radio frequency functions and a first subset of baseband functions, and the downlink signals and the processed uplink signals include digital information bits, and the first subset of baseband functions include Fourier transform processing, cyclic prefix addition, resource mapping, digital precoding, layer mapping, modulation, scrambling, rate-matching, and coding for the downlink signals, and include cyclic prefix removal, Fourier transform processing, resource demapping processing, channel estimation and equalization, inverse discrete Fourier transform (IDFT) processing, demodulation, descrambling, de-rate-matching, and decoding for uplink signals.

Aspect 14: The method of any of aspects 1 through 13, further comprising: receiving updated configuration information that provides a reconfigured first set of functions that include more or fewer baseband functions that are to be performed at the radio unit; reconfiguring the first set of functions at the radio unit based at least in part on the updated configuration information; and communicating with the UE and the central unit or distributed unit using the reconfigured first set of functions.

Aspect 15: The method of any of aspects 1 through 14, wherein the radio unit hosts baseband and radio frequency functions, and is collocated with the distributed unit that hosts medium access control and radio link control functions.

Aspect 16: The method of any of aspects 1 through 15, wherein the radio unit hosts baseband and radio frequency functions, and medium access control and radio link control functions are split between the radio unit and the central unit; and wherein a plurality of radio units support coordinated multipoint (CoMP) communications where same transport blocks are transmitted by the plurality of radio units to the UE with non-coherent precoding, and the plurality of radio units receive and independently decode uplink communications from the UE.

Aspect 17: The method of any of aspects 1 through 16, wherein the radio unit hosts radio frequency functions, the distributed unit hosts baseband functions, medium access control, and radio link control functions; and wherein a plurality of radio units support coordinated multipoint (CoMP) communications with coherent or non-coherent precoding.

Aspect 18: The method of any of aspects 1 through 17, wherein the radio unit hosts radio frequency functions and baseband functions including precoding and combining, and the distributed unit hosts medium access control and radio link control functions; and wherein a plurality of radio units support massive multiple-input-multiple-output (M-MIMO) communications a plurality of UEs.

Aspect 19: A method for wireless communication at a distributed unit in a wireless communications system, comprising: identifying configuration information that includes a second set of functions to be performed at the distributed unit, wherein a radio unit coupled with the distributed unit performs a first set of functions including radio frequency functions for radio frequency communications with at least one UE, and wherein the distributed unit has a capability to perform baseband functions, medium access control functions, or any combinations thereof, and the second set of functions includes at least one medium access control function; configuring the second set of functions at the distributed unit based at least in part on the identifying, wherein the second set of functions includes a second set of downlink functions and a second set of uplink functions; receiving, from a central unit, downlink data that is to be processed according to the second set of downlink functions; processing the downlink data according to the second set of downlink functions to generate downlink signals for processing and transmission by the radio unit; and communicating the downlink signals to the radio unit for processing according to the first set of functions and transmission to the UE.

Aspect 20: The method of aspect 19, further comprising: receiving uplink signals from the radio unit; processing the received uplink signals according to the second set of uplink functions to generate uplink data; and communicating the uplink data to the central unit.

Aspect 21: The method of aspect 20, wherein the uplink signals from the radio unit and the downlink signals to the radio unit include digital I/Q samples, and the second set of functions includes all baseband functions and medium access control functions.

Aspect 22: The method of any of aspects 20 through 21, wherein the downlink signals and the uplink signals include digitally precoded tones, and the second set of functions include a subset of baseband functions and the medium access control functions, and the radio unit performs one or more baseband functions that are not included in the subset of baseband functions.

Aspect 23: The method of aspect 20, wherein the downlink signals and the uplink signals include digital information bits, and the second set of functions include only the medium access control functions, and the radio unit performs all of the baseband functions.

Aspect 24: The method of any of aspects 19 through 23, further comprising: receiving updated configuration information that provides a reconfigured second set of functions that include more or fewer baseband functions that are to be performed at the distributed unit; reconfiguring the second set of functions at the distributed unit based at least in part on the updated configuration information; and communicating with the radio unit and the central unit using the reconfigured second set of functions.

Aspect 25: An apparatus for wireless communication at a radio unit of a wireless communications system, comprising a processor; memory coupled with the processor; and instructions stored in the memory and executable by the processor to cause the apparatus to perform a method of any of aspects 1 through 18.

Aspect 26: An apparatus for wireless communication at a radio unit of a wireless communications system, comprising at least one means for performing a method of any of aspects 1 through 18.

Aspect 27: A non-transitory computer-readable medium storing code for wireless communication at a radio unit of a wireless communications system, the code comprising instructions executable by a processor to perform a method of any of aspects 1 through 18.

Aspect 28: An apparatus for wireless communication at a distributed unit in a wireless communications system, comprising a processor; memory coupled with the processor; and instructions stored in the memory and executable by the processor to cause the apparatus to perform a method of any of aspects 19 through 24.

Aspect 29: An apparatus for wireless communication at a distributed unit in a wireless communications system, comprising at least one means for performing a method of any of aspects 19 through 24.

Aspect 30: A non-transitory computer-readable medium storing code for wireless communication at a distributed unit in a wireless communications system, the code comprising instructions executable by a processor to perform a method of any of aspects 19 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a radio unit of a wireless communications system, comprising:
    identifying configuration information that includes a first set of functions to be performed at the radio unit, wherein the radio unit has a capability to perform radio frequency functions, baseband functions, medium access control functions, or any combinations thereof, and the first set of functions includes at least one radio frequency function;
    configuring the first set of functions at the radio unit based at least in part on the identifying, wherein the first set of functions includes a first set of downlink functions and a first set of uplink functions;
    receiving, from a central unit or a distributed unit that performs a second set of functions including at least one medium access control function, downlink signals that are to be processed according to the first set of downlink functions;
    processing the downlink signals according to the first set of downlink functions to generate a downlink communication;
    transmitting the downlink communication to at least one user equipment (UE);
    receiving radio frequency signals from the UE in a set of wireless resources associated with an uplink allocation granted to the UE for an uplink communication;
    processing the received radio frequency signals according to the first set of uplink functions to generate processed uplink signals; and
    providing the processed uplink signals to the central unit or the distributed unit to be processed according to the second set of functions.

2. The method of claim 1, further comprising:
    receiving updated configuration information that provides a reconfigured first set of functions that include more or fewer baseband functions that are to be performed at the radio unit;
    reconfiguring the first set of functions at the radio unit based at least in part on the updated configuration information; and
    communicating with the UE and the central unit or the distributed unit using the reconfigured first set of functions.

3. The method of claim 1, wherein the radio unit hosts baseband and radio frequency functions, and is collocated with the distributed unit that hosts medium access control and radio link control functions.

4. The method of claim 1, wherein the radio unit hosts baseband and radio frequency functions, and medium access control and radio link control functions are split between the radio unit and the central unit, and wherein a plurality of radio units support coordinated multipoint (CoMP) communications where same transport blocks are transmitted by the plurality of radio units to the UE with non-coherent precoding, and the plurality of radio units receive and independently decode uplink communications from the UE.

5. The method of claim 1, wherein the radio unit hosts the radio frequency functions, the distributed unit hosts the baseband functions, medium access control, and radio link control functions, and wherein a plurality of radio units support coordinated multipoint (CoMP) communications with coherent or non-coherent precoding.

6. The method of claim 1, wherein the radio unit hosts the radio frequency functions and the baseband functions including precoding and combining, and the distributed unit hosts medium access control and radio link control functions, and wherein a plurality of radio units support massive multiple-input-multiple-output (M-MIMO) communications a plurality of UEs.

7. The method of claim 1, wherein the first set of functions includes only the radio frequency functions and wherein the downlink signals and the processed uplink signals include digital I/Q samples.

8. The method of claim 7, wherein the second set of functions are performed at the distributed unit and include the baseband functions and the medium access control functions.

9. The method of claim 7, wherein the first set of downlink functions include a digital-to-analog conversion function and a transmit analog beamforming function, and the first set of uplink functions include a receive analog beamforming function and an analog-to-digital conversion function.

10. The method of claim 1, wherein the first set of functions includes the radio frequency functions and a first subset of the baseband functions, and wherein the downlink signals and the processed uplink signals include digitally precoded tones.

11. The method of claim 10, wherein the second set of functions are performed at the distributed unit and include a second subset of the baseband functions and the medium access control functions.

12. The method of claim 10, wherein the first subset of the baseband functions include downlink Fourier transform processing and cyclic prefix addition for the downlink signals, and include cyclic prefix removal and uplink Fourier transform processing for uplink signals.

13. The method of claim 1, wherein the first set of functions includes the radio frequency functions and a first subset of the baseband functions, and wherein the downlink signals and the processed uplink signals include non-precoded tones.

14. The method of claim 13, wherein the first subset of the baseband functions include downlink Fourier transform processing, cyclic prefix addition, resource mapping, and digital precoding for the downlink signals, and include cyclic prefix removal, uplink Fourier transform processing, and resource demapping processing for uplink signals.

15. The method of claim 7, wherein the first set of functions includes the radio frequency functions and a first subset of the baseband functions, and wherein the downlink signals include encoded bits and the processed uplink signals include log likelihood ratio (LLR) metrics.

16. The method of claim 15, wherein the first subset of the baseband functions include downlink Fourier transform processing, cyclic prefix addition, resource mapping, digital precoding, layer mapping, and modulation for the downlink signals, and include cyclic prefix removal, uplink Fourier transform processing, resource demapping processing, channel estimation and equalization, inverse discrete Fourier transform (IDFT) processing, and demodulation for uplink signals.

17. The method of claim 1, wherein the first set of functions includes the radio frequency functions and a first subset of the baseband functions, and wherein the downlink signals and the processed uplink signals include digital information bits, and wherein the first subset of the baseband functions include downlink Fourier transform processing, cyclic prefix addition, resource mapping, digital precoding, layer mapping, modulation, scrambling, rate-matching, and coding for the downlink signals, and include cyclic prefix removal, uplink Fourier transform processing, resource demapping processing, channel estimation and equalization, inverse discrete Fourier transform (IDFT) processing, demodulation, descrambling, de-rate-matching, and decoding for uplink signals.

18. A method for wireless communication at a distributed unit in a wireless communications system, comprising:
identifying configuration information that includes a second set of functions to be performed at the distributed unit, wherein a radio unit coupled with the distributed unit performs a first set of functions including radio frequency functions for radio frequency communications with at least one user equipment (UE), and wherein the distributed unit has a capability to perform baseband functions, medium access control functions, or any combinations thereof, and the second set of functions includes at least one medium access control function;
configuring the second set of functions at the distributed unit based at least in part on the identifying, wherein the second set of functions includes a second set of downlink functions and a second set of uplink functions;
receiving, from a central unit, downlink data that is to be processed according to the second set of downlink functions;
processing the downlink data according to the second set of downlink functions to generate downlink signals for processing and transmission by the radio unit; and
communicating the downlink signals to the radio unit for processing according to the first set of functions and transmission to the UE.

19. The method of claim 18, further comprising:
receiving updated configuration information that provides a reconfigured second set of functions that include more or fewer baseband functions that are to be performed at the distributed unit;
reconfiguring the second set of functions at the distributed unit based at least in part on the updated configuration information; and
communicating with the radio unit and the central unit using the reconfigured second set of functions.

20. The method of claim 18, further comprising:
receiving uplink signals from the radio unit;
processing the received uplink signals according to the second set of uplink functions to generate uplink data; and
communicating the uplink data to the central unit.

21. The method of claim 20, wherein the uplink signals from the radio unit and the downlink signals to the radio unit include digital I/Q samples, and the second set of functions includes all of the baseband functions and all of the medium access control functions.

22. The method of claim 20, wherein the downlink signals and the uplink signals include digitally precoded tones, and wherein the second set of functions include a subset of the baseband functions and the medium access control functions, and wherein the radio unit performs one or more baseband functions that are not included in the subset of the baseband functions.

23. The method of claim 20, wherein the downlink signals and the uplink signals include digital information bits, and wherein the second set of functions include only the medium access control functions, and wherein the radio unit performs all of the baseband functions.

24. An apparatus for wireless communication at a radio unit of a wireless communications system, comprising:
a processor,
memory coupled with the processor; and instructions stored in the memory and executable by the processor to cause the apparatus to:
    identify configuration information that includes a first set of functions to be performed at the radio unit, wherein the radio unit has a capability to perform radio frequency functions, baseband functions, medium access control functions, or any combinations thereof, and the first set of functions includes at least one radio frequency function;
    configure the first set of functions at the radio unit based at least in part on the identifying, wherein the first set of functions includes a first set of downlink functions and a first set of uplink functions;
    receive, from a central unit or a distributed unit that performs a second set of functions including at least one medium access control function, downlink signals that are to be processed according to the first set of downlink functions;
    process the downlink signals according to the first set of downlink functions to generate a downlink communication;
    transmit the downlink communication to at least one user equipment (UE);
    receive radio frequency signals from the UE in a set of wireless resources associated with an uplink allocation granted to the UE for an uplink communication;
    process the received radio frequency signals according to the first set of uplink functions to generate processed uplink signals; and
    provide the processed uplink signals to the central unit or the distributed unit to be processed according to the second set of functions.

25. The apparatus of claim 24, wherein the instructions are further executable by the processor to cause the apparatus to:
    receive updated configuration information that provides a reconfigured first set of functions that include more or fewer baseband functions that are to be performed at the radio unit;
    reconfigure the first set of functions at the radio unit based at least in part on the updated configuration information; and
    communicate with the UE and the central unit or the distributed unit using the reconfigured first set of functions.

26. An apparatus for wireless communication at a distributed unit in a wireless communications system, comprising:
    a processor,
    memory coupled with the processor; and
    instructions stored in the memory and executable by the processor to cause the apparatus to:
        identify configuration information that includes a second set of functions to be performed at the distributed unit, wherein a radio unit coupled with the distributed unit performs a first set of functions including radio frequency functions for radio frequency communications with at least one user equipment (UE), and wherein the distributed unit has a capability to perform baseband functions, medium access control functions, or any combinations thereof, and the second set of functions includes at least one medium access control function;
        configure the second set of functions at the distributed unit based at least in part on the identifying, wherein the second set of functions includes a second set of downlink functions and a second set of uplink functions;
        receive, from a central unit, downlink data that is to be processed according to the second set of downlink functions;
        process the downlink data according to the second set of downlink functions to generate downlink signals for processing and transmission by the radio unit;
        communicate the downlink signals to the radio unit for processing according to the first set of functions and transmission to the UE;
        receive uplink signals from the radio unit;
        process the received uplink signals according to the second set of uplink functions to generate uplink data; and
        communicate the uplink data to the central unit.

27. The apparatus of claim 26, wherein the instructions are further executable by the processor to cause the apparatus to:
    receive updated configuration information that provides a reconfigured second set of functions that include more or fewer baseband functions that are to be performed at the distributed unit;
    reconfigure the second set of functions at the distributed unit based at least in part on the updated configuration information; and
    communicate with the radio unit and the central unit using the reconfigured second set of functions.

* * * * *